United States Patent
Mizrahi et al.

(10) Patent No.: US 8,429,751 B2
(45) Date of Patent: Apr. 23, 2013

(54) METHOD AND APPARATUS FOR PHISHING AND LEECHING VULNERABILITY DETECTION

(75) Inventors: Rami Mizrahi, Herzliya (IL); Galit Efron-Nitzan, Herzliya (IL); Or Katz, Herzliya (IL)

(73) Assignee: Trustwave Holdings, Inc., Chicago, IL (US)

( * ) Notice: Subject to any disclaimer, the term of this patent is extended or adjusted under 35 U.S.C. 154(b) by 340 days.

(21) Appl. No.: 12/722,778

(22) Filed: Mar. 12, 2010

(65) Prior Publication Data

US 2010/0235918 A1   Sep. 16, 2010

Related U.S. Application Data

(60) Provisional application No. 61/159,933, filed on Mar. 13, 2009, provisional application No. 61/159,942, filed on Mar. 13, 2009.

(51) Int. Cl.
 *H04L 29/06*   (2006.01)
(52) U.S. Cl.
 USPC .......... 726/25; 726/22; 726/23; 726/24; 726/26; 713/187; 709/223; 709/224; 709/227
(58) Field of Classification Search .......... 726/22–30; 709/217–219, 223–229; 713/187
 See application file for complete search history.

(56) References Cited

U.S. PATENT DOCUMENTS

| | | | |
|---|---|---|---|
| 5,870,546 A * | 2/1999 | Kirsch | 709/205 |
| 7,984,500 B1 * | 7/2011 | Khanna et al. | 726/22 |
| 8,117,325 B1 * | 2/2012 | Wu | 709/229 |
| 2002/0032870 A1 * | 3/2002 | Spusta et al. | 713/201 |
| 2006/0123464 A1 * | 6/2006 | Goodman et al. | 726/2 |
| 2007/0033639 A1 | 2/2007 | Goodman et al. | |
| 2007/0294762 A1 | 12/2007 | Shraim et al. | |
| 2008/0147837 A1 | 6/2008 | Klein et al. | |
| 2009/0070872 A1 * | 3/2009 | Cowings et al. | 726/23 |
| 2010/0106564 A1 * | 4/2010 | Manesh et al. | 705/10 |
| 2011/0166935 A1 * | 7/2011 | Armentrout et al. | 705/14.54 |

FOREIGN PATENT DOCUMENTS

KR   10-2008-0095633 A   10/2008

OTHER PUBLICATIONS

Client-side defense against web-based identity theft by Chou et al; Year: 2004; Publisher: Stanford.*

* cited by examiner

*Primary Examiner* — Taghi Arani
*Assistant Examiner* — Madhuri Herzog
(74) *Attorney, Agent, or Firm* — Hanley, Flight & Zimmerman, LLC

(57) ABSTRACT

A system and method for protection of Web based applications are described. Anomalous traffic can be identified by comparing the traffic to a profile of acceptable user traffic when interacting with the application. Phishing and leeching are one type of anomalous traffic that is detected. The anomalous traffic, or security events, identified at the individual computer networks are communicated to a central security manager. Various responsive actions may be taken in response to detection of phishing or leeching.

8 Claims, 11 Drawing Sheets

METHOD AND APPARATUS FOR PHISHING AND LEECHING VULNERABILITY DETECTION

RELATED APPLICATIONS

This application claims the benefit of U.S. Provisional Patent Application Ser. No. 61/159,933, filed Mar. 13, 2009, entitled "METHOD AND APPARATUS FOR PHISHING AND LEECHING DETECTION," and claims the benefit of U.S. Provisional Patent Application Ser. No. 61/159,942, filed Mar. 13, 2009, entitled "METHOD AND APPARATUS FOR PHISHING VULNERABILITY DETECTION," which are hereby incorporated by reference in their entirety.

FIELD OF THE INVENTION

This invention relates to computer network security, and more particularly preventing and detecting attacks on web-based applications.

BACKGROUND

Recent, well publicized, security breaches have highlighted the need for improved security techniques to protect consumer privacy and secure digital assets. Examples of organizational victims of cybercrime include well known companies that typically have traditional Web security in place, yet cyber criminals have still been able to obtain personal data from financial, healthcare, retail, and academic Web sites.

Organizations can not afford negative brand image, credibility damage, legal consequences, or customers losses. The disclosure of some of these Web security breaches has led law enforcement to determine, after careful investigation, that cybercrime is in some instances being driven by organized crime that can dedicate significant resources toward attempting to circumvent security systems. Targeted rings of well educated and sophisticated hackers have been uncovered, often in countries where prosecuting them is a challenge. Contributing to the increase in cybercrime is the ease with which these organized cyber criminals can target, and hack, a Web application from anywhere in the world with simple Internet access.

Properly securing Web applications and the data behind them is a critical component to doing business on the Web. Often, some of the most valuable organizational data is served through a Web browser making it more important than ever to safeguard this information from cybercriminals.

Thus, there is a need for improved systems and techniques to protect Web applications from security breaches.

SUMMARY

Techniques for preventing attacks of Web based, or network based, applications are described. These techniques include detection of phishing and leeching activity by inspecting HTTP referrer headers whenever access to files on a local server is requested. If an HTTP referrer header reveals that the request originates from an external source, an event can be triggered, and one or more responsive actions can be performed in response to the event. An administrator may then investigate the external source to determine if the phishing and leeching are purposeful and what appropriate action should be taken against the phisher. The techniques also include techniques for identifying phishing vulnerability. For example, phishing vulnerability due to open redirect parameters can be detected by identifying redirect parameters as constant parameters of type URL. Once a constant parameter of type URL is identified, the constant parameter of type URL is inspected to determine if the redirect parameter detected is used for a redirect function. If the redirect parameter detected is not used for a redirect function, no further action is necessary. If the redirect parameter detected is used for a redirect function, validation of the redirect parameter is performed.

In an embodiment, a method securing a web server from phishing and leeching activity is provided. The method includes receiving a request to access content at an application security system, identifying a source of the request and a local host to which the request is directed using the application security system, determining whether the source of the request is an external source, and performing a responsive action if the source of the request is received from an external source.

In another embodiment, a method for securing a web server by detecting phishing vulnerability is provided. The method includes receiving an HTTP request at an application security system, identifying link parameters in the HTTP request, determining whether the HTTP request includes a redirect to one of the link parameters, determining whether the redirect is to a local host if the HTTP request includes a redirect, and performing a responsive action if redirect is to external source.

In yet another embodiment, a computer-readable medium comprising processor-executable instructions that, when executed, direct a computer system to perform actions for securing a web server from phishing and leeching activity is provided. The actions include receiving a request to access content at an application security system, identifying a source of the request and a local host to which the request is directed using the application security system. determining whether the source of the request is an external source, and performing a responsive action if the source of the request is received from an external source.

In yet another embodiment, a computer-readable medium comprising processor-executable instructions that, when executed, direct a computer system to perform actions for securing a web server by detecting phishing vulnerability is provided. The actions include receiving an HTTP request at an application security system, identifying link parameters in the HTTP request, determining whether the HTTP request includes a redirect to one of the link parameters, determining whether the redirect is to a local host if the HTTP request includes a redirect; and performing a responsive action if redirect is to external source.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
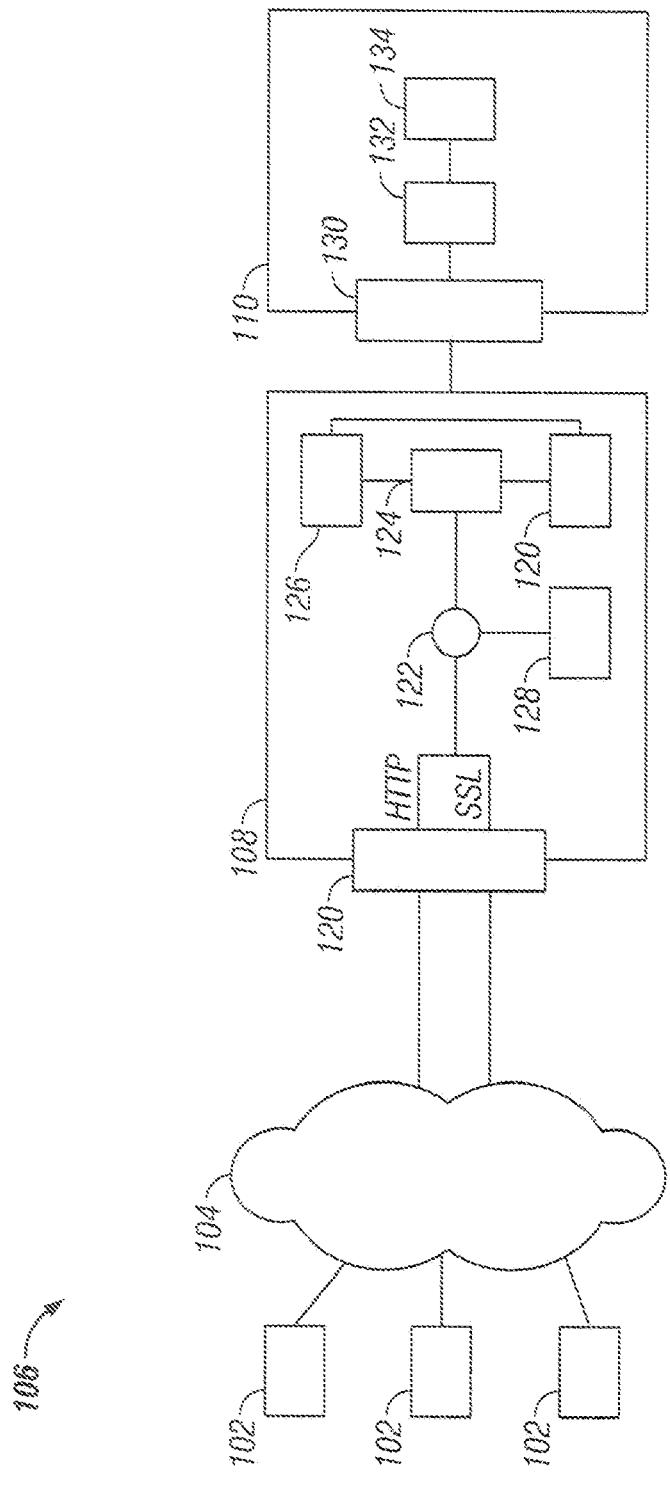
FIG. 1 is a block diagram of an example system configured according to an embodiment.

The following detailed description is directed to certain specific embodiments of the invention. However, the invention can be embodied in a multitude of different systems and methods. In this description, reference is made to the drawings wherein like parts are designated with like numerals throughout.

Need for Increased Security

Government regulations for privacy and accountability mandate that there be a standard of security and customer notification if personal data is lost or stolen. For example, in the United States, many states have enacted a form of the Information Security Breach Act and other states have similar pending privacy legislation. Organizations are also motivated by consumer expectations to incorporate security measures to safeguard data. Some industries, such as the credit card industry, have enacted their own data security standards. However, the number of data security and notifications laws informing consumers of data breaches is likely to increase. Therefore, organizations are motivated to improve and validate existing security measures that protect the organization from Web threats and to demonstrate to regulators and stakeholders that security is interwoven into the business operations.

Shortcomings in Existing Security Measures

The growth of the Internet as a network for commerce and communications has been unprecedented. However, security was not part of the original design of the Internet, leaving Web applications susceptible to security breaches. The rapid expansion of the use of the Internet has also led many organizations to migrate applications to the Internet that were originally designed for use on internal network environments. The internal network environments were typically run on networks and servers protected by firewalls and intrusion detection systems. A cyber-criminal would have to circumvent these protections in order to access sensitive data stored on servers within in internal network environment. As Web-based applications have evolved, hackers have shifted their focus to targeted attacks on these applications. Often these applications provide a front-end to an organization's mission critical data. Hackers no longer need to search for sensitive data on the organizations network and can instead simply browse the organization's web site to identify sensitive data.

A common misconception in Web security is that using Secure Sockets Layer (SSL) will protect a Web application from attacks. While SSL supports secure transmission of sensitive information, but SSL does not protect a Web application from attack. SSL merely product protection of data during transmission. Attacks can be sent using SSL and the SSL transmission goes through firewalls because the firewall will usually have a port, typically port 443, open to permit SSL traffic. For example, SQL Injection attacks (described in detail below) can circumvent network security because the SQL commands used in the attack can be transmitted to the web application using SSL.

Conventional application protection solutions or application firewalls followed the same paradigm as network firewalls where a negative or list-based model of application level threats is used to screen for potential application-level attacks. But, the negative model is generally not effective in securing Web-based applications from attack since each Web based application is unique and has unique security concerns. One approach was to create a tailored application security profile for each application, but this approach can be too cumbersome and time consuming, particularly in a production environment where multiple web applications may be deployed.

Furthermore, many conventional application protection solutions are configured to be an in-line device. Being an in-line device, the solutions have to ensure that there is no, or minimal, impact to production network operations, including considerations such as traffic latency, the introduction of false positives, and the potential to block a valid transaction.

Example Aspects of a Web Application Security System

FIG. 1 is a block diagram of an example web application security system configured in accordance with aspects of the invention. As shown in FIG. 1 users 102 are in communication with a wide area network 104. The wide area network 104 may be a private network, a public network, a wired network, a wireless network, or any combination of the above, including the Internet. Also in communication is a computer network 106. A typical computer network 106 may include two network portions, a so called demilitarized zone (DMZ) 108, and a second infrastructure network 110. The DMZ 108 is usually located between the wide area network 104 and the infrastructure network 110 to provide additional protection to information and data contained in the infrastructure network 110.

For example, the infrastructure network 110 may include confidential and private information about a corporation, and the corporation wants to ensure that the security and integrity of this information is maintained. However, the corporation may host a web site and may also desire to interface with users 102 of the wide area network 104. For example, the corporation may be engaged in e-commerce and wants to use the wide area network 104 to distribute information about products that are available to customers, and receive orders from customers. The interface to the wide area network 104, which is generally more susceptible to attacks from cyber-criminals is through the DMZ 108, while sensitive data, such as customer credit card information and the like, are maintained in the infrastructure network 110 which is buffered from the wide area network 104 by the DMZ 108.

Examples of components in a DMZ 108 include a firewall 120 that interfaces the DMZ 108 to the wide area network 104. Data transmitted and received from the wide area network 104 pass through the firewall 120, through a mirror port 122 to a load balancer 124 that controls the flow of traffic to web servers 126. Also connected to the mirror port 122 is a Web application protection module 128. As described further below, the Web application protection module 128 monitors traffic entering and leaving the DMZ to detect if the Web site is being attacked.

Traffic flows between the DMZ 108 and the infrastructure network 110 through a second firewall 130 that provides additional security to the infrastructure network 110. Components in the infrastructure network 110 can include an application server 132 and a database server 134. Data and information on the application server 132 and database server 134 are provided additional protection from attacks because of the operation of the DMZ.

Security Model to Protect Web Applications

Typically, network-level devices use a negative security model or "allow all unless an attack is identified." Network-level devices such as Intrusion Detection and Prevention Systems are effective with this generic negative model because network installations are common across organizations. However, every Web application is different and a generic or "one-size-fits-all" model for security generally will not work satisfactorily.

A positive, behavior-based security model is generally more effective in securing Web applications. Because each Web application is unique, they expose their own individual sets of vulnerabilities that need to be addressed. A positive behavior-based security model provides protection against threats that are outside the bounds of appropriate, or expected, behavior. Because the security model monitors behavior to determine if it is appropriate, the model can provide protection against unforeseen threats.

To implement a positive, behavior-based security model, a tailored application security profile is created that defines appropriate application behavior. While a unique security profile is needed for every Web application, manual creation of these profiles may be overly burdensome. Instead, it would be beneficial to create security profiles automatically for each application. In addition, it would be beneficial to automate profile maintenance which ensures that application changes are incorporated into the profile on an on-going basis.

As noted, Web applications expose a new set of vulnerabilities that can only be properly understood within the context of the particular application. For example, SQL injection attacks are only valid in applications that take user input. Likewise, forceful browsing attempts can only be determined by understanding the interplay of all the scripts and components that make up the Web application. Further, session manipulation techniques can only be identified by understanding the session mechanism implemented by the application.

To effectively protect a Web application requires understanding how the application works. Thus, generic protection mechanisms, such as those provided by network security devices, are typically inadequate due to a high rate of false positives or attacks missed entirely due to a lack of understanding of where exploitable vulnerabilities are exposed within a specific application.

Exemplary Embodiments of Web Application Security

In one embodiment of the Web application security system, protection techniques are adapted to address the unique security challenges inherent in Web applications. The techniques fill holes in network-level security, provides tailored application-specific security, and comprehensive protection against an array of potential Web-based threats.

The techniques include combining a behavioral protection model with a set of collaborative detection modules that includes multiple threat detection engines to provide security analysis within the specific context of the Web application. In addition, the techniques reduce the manual overhead encountered in configuring a behavioral model, based upon a profile of typical or appropriate interaction with the application by a user, by automating the process of creating and updating this profile. Further, the techniques include a robust management console for ease of setup and management of Web application security. The management console allows security professionals to setup an application profile, analyze events, and tune protective measures. In addition, the management console can provide security reports for management, security professionals and application developers.

The techniques described further below, allow organizations to implement strong application-level security using the same model that is currently used to deploy the applications themselves. The techniques include additional advantages over other technologies by not requiring an inline network deployment. For example, the techniques have minimal impact on network operations because they can be deployed off of a span port or network tap and does not introduce another point of failure or latency to network traffic.

While the techniques described are not implemented inline, they can prevent attacks against Web applications by interoperating with existing network infrastructure devices, such as firewalls, load balancers, security information management (SIM) and security event management (SEM) tools. Because Web application attacks are typically targeted, and may require reconnaissance, the techniques are adapted to block attacks from a hacker, or cyber-criminal, before they are able to gather enough information to launch a successful targeted attack. Various techniques may be combined, or associated, to be able to identify and correlate events that show an attacker is researching the site, thereby giving organizations the power to see and block sophisticated targeted attacks on the application.

Some of the advantages provided by the techniques described include protecting privileged information, data, trade secrets, and other intellectual property. The techniques fill gaps in network security that were not designed to prevent targeted application level attacks. In addition, the techniques dynamically generate, and automatically maintain, application profiles tailored to each Web application. The techniques can also provide passive SSL decryption from threat analysis without terminating an SSL session.

The techniques can also provide flexible distributed protection based upon a distributed detect/prevention architecture (DDPA). Additional protection of customer data is provided by exit control techniques that detect information leakage. A graphical user interface (GUI) can provide detailed event analysis results as well as provide detailed and summary level reports that may be used for compliance and audit reports. Use of various combinations of these techniques can provide comprehensive protection against known, as well as unknown, Web threats.

Figure 2:
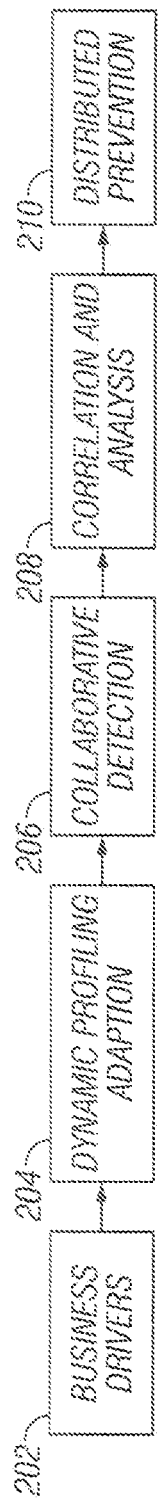
FIG. 2 is a block diagram illustrating aspects of an example embodiment of a Web application protection system which can be carried out by the Web application protection module of FIG. 1 according to an embodiment.

FIG. 2 is a block diagram illustrating aspects of an example embodiment of a Web application protection system which can be carried out by the Web application protection module 128 in FIG. 1. As shown in FIG. 2, a business driver module 202 provides input about the types of threats that are anticipated, and that protection against is sought, or the types of audits or regulations that an entity wants to comply with.

Examples of threats include identity theft, information leakage, corporate embarrassment, and others. Regulatory compliance can include SOX, HIPAA, Basel LL, GLBA, and industry standards can include PCI/CISP, OWASP, and others. The business driver module 202 provides input to a dynamic profiling module 204.

The dynamic profiling module 204 develops profiles of Web applications. The profiles can take into account the business drivers. The profiles can also be adapted as Web applications are used and user's behavior is monitored so that abnormal behavior may be identified. The profiles can also be adapted to identify what types of user input is considered appropriate, or acceptable. Dynamic profiling module 204 provides input to a collaborative detection module 206.

The collaborative detection module 206 uses the input from the dynamic profiling module 204 to detect attacks against a Web application. The collaborative detection module can monitor, and model, a user's behavior to identify abnormal behavior of a user accessing a Web application. The collaborative detection module 206 can also monitor user activity to identify signatures of attack patterns for known vulnerabilities in a Web application. Other aspects include protection against protocol violations, session manipulation, usage analysis to determine if a site is being examined by a potential attacker, monitoring out bound traffic, or exit control, as well as other types of attack such as XML virus, parameter tampering, data theft, and denial of services attacks. The collaborative detection module 206 provides the results of its detection to a correlation and analysis module 208.

The correlation and analysis module 208 receives the detection results from the collaborative detection module 206 and performs event analysis. The correlation and analysis module 208 analyses events reported by the collaborative detection module 206 to determine if an attack is taking place. The correlation and analysis module 208 can also correlate incoming requests from users with outgoing response to detect if there is application defacement or malicious content modification being performed. The correlation and analysis module may establish a severity level of an attack based upon a combined severity of individual detections. For example, if there is some abnormal behavior and some protocol violations, each of which by itself may set a low severity level, the combination may raise the severity level indicating that there is an increased possibility of an attack. The output of the correlation and analysis module 208 is provided to a distributed prevention module 210.

The distributed prevention module 210 provides a sliding scale of responsive actions depending on the type and severity of attack. Examples of responses by the distribution prevention module 210 include monitor only, TCP-resets, load-balancer, session-blocking, firewall IP blocking, logging users out, and full blocking with a web server agent. The distribution prevention module 210 can also include alert mechanisms that provide event information to network and security management systems through SNMP and syslog, as well an email and console alerts.

Using the dynamic profiling module 204, collaborative detection module 206, correlation and analysis module 208, and distributed prevention module 210 security for a Web application can be provided. Improved Web application security provides protection of privileged information, increased customer trust and confidence, audit compliance, increased business integrity, and brand production.

Figure 3:
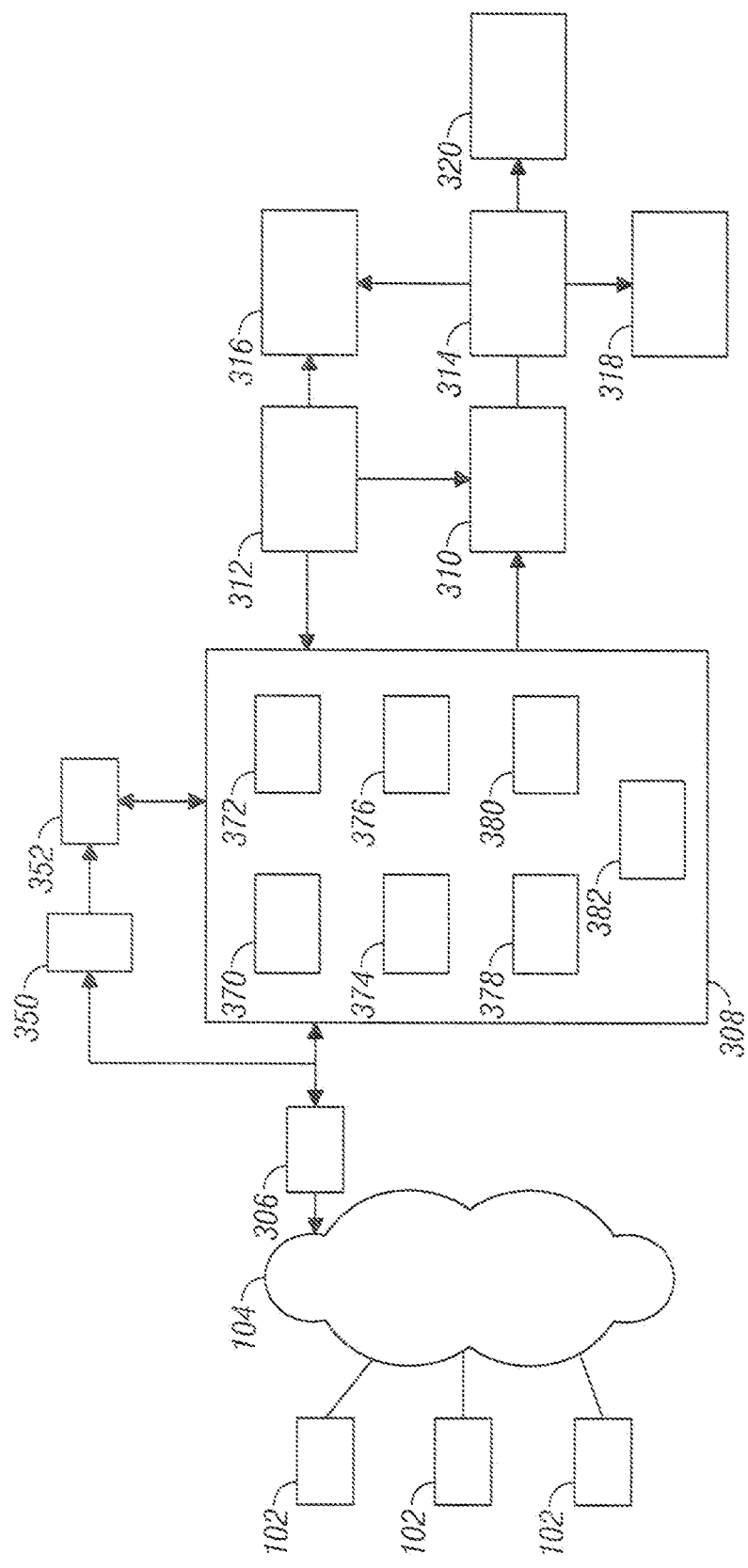
FIG. 3 is a block diagram of illustrating further detail of an example dataflow in a Web application security technique as may be performed by the Web application protection module of FIG. 1.

FIG. 3 is a block diagram of illustrating further detail of an example dataflow in a Web application security technique as may be performed by the Web application protection module 128 of FIG. 1. As illustrated in FIG. 3 multiple users 102 are in communication with a wide area network 104, such as the Internet. The users may desire to access a Web application. Typically, a user will access a Web application with web traffic using SSL encryption. A SSL decryption module 306 can passively decrypt the traffic to allow visibility into any embedded threats in the web traffic. The web traffic then flows to a collaborative detection module 308 where the traffic is analyzed in the context of appropriate application behavior compared to the applications' security profile. If an anomaly is discovered, it is passed to one or more of the multiple threat-detection engines included within the collaborative detection module 308. The results from the collaborative detection module 308 are communicated to an Advanced Correlation Engine (ACE) 310 where it is determined the threat context and to reduce false positives. In addition, the collaborative detection module 308 monitors outbound traffic as well as inbound traffic to prevent data leakage such as Identity Theft.

Application Learning System (ALS)

An application learning systems (ALS) as may be performed in the adaptation module 350 in FIG. 3 is described The ALS can develop ranges that are based on property reference (Property-REF) calculations of parameters. In addition the ALS can perform standard deviation (STD-DEV) calculation. STD-DEV ranges can be calculated, for example, from the following attributes:

a) Header length (single range)

b) Variant Parameter value length.

c) Page Signature—Content Size attribute.

d) Page Signature—Number of Forms attribute.

e) Page Signature—Number of Links attribute.

f) Page Signature—Number of Images attribute.

g) Patterns—Permitted Type patterns.

To support debugging, the ALS can support manual retrieval of specific range type (STD-DEV or Property-REF) from the database, as well differentiation between the types. A configuration range (RANGE_ALG) directive for range types can be defined that will support the options listed in Table 1 below:

TABLE 1

| Range Types | |
| --- | --- |
| Option | Meaning |
| PROPERTY_REF | The ALS can define ranges according to Property-REF calculation only. |
| STD_DEV | The ALS can define ranges according to STD-DEV calculation only. |
| PROPERTY_REF_AND_STD_DEV | The ALS can define ranges according to both Property-REF and STD-DEV calculation. |

Generally a range violation event should not be generated if input length is covered by one of the range types available. In addition, an event should not indicate which range type (i.e. produced by Property-REF or STD-DEV) was violated. To reduce the number of events during a first phase, or an initial policy phase, set with high values range violation can be used. Table 2 below lists possible range values:

TABLE 2

Range Values

| Name | Type and Range | Default (current default) |
|---|---|---|
| Max URL length (before query) | 1-4046 | 2000 (512) |
| Max query length | 1-4046 | 2000 (800) |
| Max parameters | 1-MAX_PARAMETER_NUM (1000) | 100 (40) |
| Max parameter length | 2-4096 | 1000 (500) |
| Max number of headers | 1-100 | 50 (40) |
| Max length of a header | 1-4096 | 2000 (1000) |
| Max chunks in content | 1-MAX_REQUEST_CHUNIKS (20) | 20 (20) |
| Rejected strings in headers | String list | |
| Rejected strings in query | String list | -- union insert drop delete |
| Rejected strings in content | String list | -- union insert drop delete |
| Rejected strings in URL | String list | |
| Rejected strings in normalized URL | String list | /etc/passwd |
| Supported file extensions | String list | |
| Allow no file extensions | Boolean | NO |
| Ignore URL Fragments | Boolean | NO |

The following Initial Policy attributes, for example, can be updated according to ALS data:
  a) Maximum URL length (before query)
  b) Maximum query length
  c) Maximum parameters
  d) Maximum parameter length
  e) Maximum number of headers
  f) Maximum length of a header
  g) Supported file extensions In one embodiment, limits can be established in accordance with the highest values handled until reaching a desired phase number and their corresponding requests which result with an acceptable status code. To make sure that limits are not too restricted, a factor can be used. A file extension can be derived from the URL list learned during a first phase. A test can be performed to determine the acceptable file extensions. For example, executable files, with an ".exe" extension, can be removed. In one embodiment, once an extension has passed the test it can be considered valid for the entire site. In other embodiments, extensions are periodically or intermittently tested. Learnt URLs, which their extensions were defined as invalid, should be reported and removed from the system. One technique that can be used to reduce the number of false positives is to divide the event headers into two groups:
  1. Self-Protected headers. For each header assigned to this group the ALS acts according to its 3M setting.
  2. Protected by Initial Policy. For each header assigned to this group
     a) The ALS acts according to the Initial Policy setting (Protection and Audit modes) for "Max header length".
     b) The 3M for this header are ignored.
     c) The ALS learns an optional range, which is available for use once the header is assigned to the other group.

In one embodiment the ALS can keep sending an event on a new header independent of the group it is assigned to. In addition, events on header violation can be sent according to an audit mode setting and group assignment.

Some headers can be assigned to a "Protected by Initial Policy" group by default. For example, the following headers may default to the Protected by Initial Policy group.

1. accept
  2. referrer
  3. user-agent
  4. accept-language
  5. accept-encoding
  6. cookie To reduce false positives, ranges produced for Page fingerprints, and Patterns can be merged using a clustering mechanism. In one embodiment, clustering can be performed according to the following steps:
  a) Sort the distances between ranges by their values, starting from the lowest distance D.
  b) Sum the existing ranges into a single value S
  c) As long as the ratio D/S is less then or equal to a desired value then
  d) Merge ranges that the distance between them is equal to D
  e) Increment S
  f) Continue to next distance.

In one embodiment, the ASL can maintain a status of the generation process, by:
  1. Adding a message to the learning log whenever a new step within the generation process is started. Messages are typically expected for the following data generation steps:
     a) HTTP Constraints
     b) HTTP Headers
     c) URLs
     d) Parameters
     e) Keys (page signatures and patterns)
     f) Cleaning collection tables
  2. Maintaining the last generation process status. This can be achieved by:
     a) Adding LAST_GEN_STATUS directive to site block in als.conf.
     b) Updating directive status whenever generation process ends.
     c) Resetting status when clearing site policy.

The ALS can also support a mechanism for change recognition. Three different examples of approaches are defined below that support an application change by the ALS. The first example enables a user to schedule a change; the other two support an internal mechanism. When a change is identified internally by the system, the user has an option to get an event only or allow the system to adopt the change as well.

The user may be able to schedule a change for a specific application rule, indicating that URLs under this rule are about to change every pre-defined period of time. The following options are typically available:
  a) Single change plus date plus time
  b) Every week plus date plus time
  c) Once a month plus date plus time Usually, as default, no change is scheduled for any of the rules. When a change is identified, according to a schedule, the following steps occur:
  a) Collected data, if exists, for resources under this application rule is removed.
  b) Policies (URLs and their objects—parameters, keys) are shifted aside for backup.
  c) The ALS handles resources located under this application rule as if it is in first learning phase, which means that events are not generated for resources under this rule.

In one embodiment the ALS supports an API to allow external mechanism (for example—event correlation mechanism, or signing—API) to indicate a resource change. The API can support a report of a URL change, and a schedule for a planned change. The API can also support indication of whether current policy should be removed. If the ALS was not requested to remove current policy, API should indicate if event generation should be stopped. According to API, the ALS:
  a) Waits until the time schedule is met.
  b) Produces an event
  c) Moves current policy to a backup, starts data collection and data generation for URL, as if it was in first phase. It means that no events are generated for this URL until new policies are generated for URL objects. Or—
  d) Keeps current policy and continues generating events (the last is according to API input). Meanwhile it starts data collection and data generation for URL, and eventually prepares a new policy for future use. The new policy will be replacing the current one according to user request.

In one embodiment, the ALS is expected to identify a potential change automatically. In this embodiment the following steps are followed:
  1. The ALS maintains a new-policy for resources that are mapped to application rules that were not assigned with a change schedule.
  2. A new-policy is generated in the following manner:
    a) Once an object reached high certainty level, and policy was generated for this object the ALS can restart collecting data for a generation of new-policy.
    b) A new-policy is generated according to the same conditions used for the generation of the real policy.
    c) Data should be collected, generated and kept in a mirrored database.
  3. Once a new-policy was generated, the ALS can restart a new-policy collection and generation process for this object. When the last is ready for use, it should replace the first.
  4. Each URL can maintain a counter that accumulates the number of times an event was generated for object located under this URL according to its current policy, but was not suppose to be generated according to its new-policy if such exists.
  5. Once a URL counter is above a specific threshold a change can be identified for this URL.
  6. According to user configuration, the ALS:
    a) Produces an event
    b) Shirts URL's objects current policies to a backup version.
    c) If the user configured, it shifts the new-policy to be the current policy for those objects.

Events can be generated in the following scenarios:
  1. The ALS identified a change according to manual or automatic scheduling.
  2. The ALS was informed on a change by an external mechanism for specific URL.
  3. The following messages can be added to the learning log:
    a) Whenever a new-policy is generated.
    b) When the current policy is shifted.
    c) When application rule change schedule takes place.

In an embodiment, The ALS can learn parameters as dates. For example, a date parameter can take any of the following formats Short Date: In all the following formats, Day and Month can be 1-2 characters long and are a valid day of the year, and Year is either 2 or 4 characters long. The slashes can be replaced by dots.
Day/Month/Year (e.g. 15 Feb. 2004)
Month/Day/Year (e.g. Mar. 15, 2004)
Day/Month (e.g. 15/March)
Month/Day (e.g. March/15)
Year/Month/Day (e.g. 2003 Mar. 15)
Long Date: In all the following formats, Weekday and Month are names of a day in the week and of a month, respectively, and are not case sensitive. They can be either the full name (Friday, January) or the short name (Fri, January). Day and Year are the same as in the short date. The commas might not appear.
Weekday, Month Day, Year (e.g. Monday, Mar. 15, 2004)
Month Day, Year (e.g. (Mar. 15, 2004)
Weekday, Day Month, Year (e.g. Mon, 15 Mar. 2004)
Day Month, Year (e.g. 15 Mar. 2004)

Strings like "31/February" (February does not have 31 days) or "Sunday, Mar. 15, 2004" (it was a Monday) will not be considered dates that match the format. Performance wise, this validation should be optional and be enabled/disabled though the general block of the als.conf configuration file. Date format can be extendible, via a configuration file. In addition, configuration can support optional separators list.

When a parameter fits a date format in at least one reference format of its appearances, the ALS can learn it as a Variant parameter of type Date. Except for ranges and character groups, the rest of the information that is normally learned (this can include the number of appearances in a request and whether it is in the query or in the content). This information can be used when validating the parameter.

In an embodiment, an event can be generated when a parameter, which is supposed to be a date, arrives in a format that does not match any of the date formats. The event description can be: "Date parameter received invalid value." The event can contain the parameter's name and value.

In an embodiment, when an object is assigned with a "data protection" flag the following actions can be taken:
  a) Events that already exist in the database and relate to this object are masked.
  b) Previous ALS data that was collected for this object is removed.
  c) Future events that contain object data should be produced while having data masked by asterisks ('*').

Typically, headers that are marked with "data protection" flag, but are protected by Initial Policy will not be masked. The event mechanism can support the masking of parameter/ header data as part of the logged request. In one example the initial policy can block a header that's not "protected by initial policy" if it's too long. In this case its data will be exposed.

The user can be exposed to different severity levels, for example, three levels represented by High/Medium/Low. To allow flexibility for events correlation process, the severity levels can be mapped internally into severity ranges. Examples for mapping of internal ranking to user presentation are listed in Table 3 below:

TABLE 3

Example Severity Levels

| Severity Level | Range |
| --- | --- |
| High | 10 < L |
| Medium | 5 < L <= 10 |
| Low | L <= 5 |

Events produced by the ALS can be assigned with an internal severity rank. The events mechanism supports submission of event severity as well.

Even removal allows the user to remove events that are no longer valid once a single event was handled/fixed by the user. For example, assume the "Accept" header has a max length value of 25, and there are 3 events for the header "Accept" indicating "header is too long—value received is X", where X is 30, 35, 40, or other desired value. Once the user updated the header settings to 35, the user can request that the system remove invalid events and, in this way, the first two events (30, 35) will be removed.

An Auto Remove API can test if an event was properly handled, and considered not valid according to current configuration. In case of valid state, the API should query the ALS for the construction of the SWL query.

Collaborative Detection Module

The following discussion provides additional detail of the collaborative detection module 308 illustrated in FIG. 3. As noted in the discussion of FIG. 3, web traffic flows to the collaborative detection module 308 where the traffic is analyzed. The traffic is analyzed by a behavior analysis engine 370 in the context of appropriate application behavior compared to the applications' security profile. If an anomaly is discovered the traffic is passed to one or more of the multiple threat-detection engines included within the collaborative detection module 308. The multiple threat-detection engines work synergistically to deliver comprehensive Web application protection that spans a broad range of potentially vulnerable areas. By working together the multiple threat-detection engines are able to uncover threats by analyzing them in the context of the acceptable application behavior, known Web attack vectors and other targeted Web application reconnaissance.

Behavioral Analysis Engine

The behavioral analysis engine 370 provides positive validation of all application traffic against a profile of acceptable behavior. A security profile of acceptable application behavior is created and maintained by the adaption module 350 which monitors Web traffic and continually updates and tunes a security profile module 352 that maintains the security profiles of applications. A security profile of an application maps all levels of application behavior including HTTP protocol usage, all URL requests and corresponding responses, session management, and input validation parameters for every point of user interaction. All anomalous traffic identified by the behavioral analysis engine 370 is passed to one or more threat detection engines to identify any attacks and provide responsive actions. This ensures protection from all known and unknown attacks against Web applications.

Signature Analysis Engine

One threat detection engine in the collaborative detection module 308 can be a signature analysis engine 372. The signature analysis engine 372 provides a database of attack patterns, or signatures, for known vulnerabilities in various Web applications. These signatures identify known attacks that are launched against a Web application or any of its components. Signature analysis provides a security context for the anomalies detected by the behavioral analysis engine 370. When attacks are identified they can be ranked by severity and can be responded to with preventative actions. This aspect of the Web application security system provides protection from known attacks against Web applications, Web servers, application servers, middleware components and scripts, and the like.

A signature is a combination of terms and conditions, that when fully met define a security issue or other meaningful event (e.g. server technology). Examples of main terms and conditions include patterns and their way of appearance in different contexts of the request/reply. For example, matching a request-reply pair for a specific signature is one technique of specifying that terms and conditions defining a signature where met by a request-reply pair.

Signatures may also be based on matching predetermined patterns against data, at specified locations, in the request-reply pair. For example, matching a pattern for "onclick" against request content. The patterns can be either a simple pattern (i.e. a string) or a regular expression. In general, pattern matching technology may be less efficient when matching regular expression as opposed to matching simple patterns. Therefore, it is usually preferred to use simple pattern over regular expression.

Following are examples of locations within the request-reply pair where signature patterns can be matched against: (1) URL, (2) a normalized URL; (3) parameters value; (4) request normalized parameters names; (5) request normalized parameters values; (6) request headers values; (7) request headers names; (8) request specific header (with provided name); (9) request content; (10) reply content; (11) reply HTML title; and (12) cookies (OTB).

In one embodiment, a signature can be composed of matching one or more patterns with various relations. For example, a relation may be that all patterns should appear, X out of Y patterns should appear, a distance between patterns should be Z, etc. Search technologies can include: (1) Simple pattern/s match—pattern/s that appear in the requested location. Each pattern is configured with a separate location. No special relations between the patterns are required; (2) Complex Pattern search—Complex Pattern is a sequence of patterns with relations of words skip or characters skip between them. One example of word skip is to search for patterns that appear with the specified number of words between them. An example search would be for a pattern of "SQL" and "error" with a work skip equal to 1.

In the example the string "SQL syntax error" matches the search, while the string "SQL error" does not match. Search patterns can also be setup where the number of words between search terms can be up to a desired number. For example, a search can be for "SQL" and "error" with a word skip value of "up to 1." In this case both the string "SQL syntax error" and the string "SQL error" match this search. It is noted that a word may be a sequence of characters. The characters that can be included in a word are configurable. The default characters are (a-z, A-Z, 0-9). Another example of a search pattern includes characters skip-patterns where a number of characters between appearances of selected characters can be specified up to a desired value.

Word boundary is another type of search pattern. In this type of search there is a match of the pattern only if its requested boundaries are not alphanumeric (a-z, A-Z, 0-9). In addition, the search can specify whether it is referring to the left boundary, the right boundary, both or either. There can also be a weighted search. In a weighted search a list of complex patterns can be specified such that at least a predefined number of patterns should appear in order to have a match.

When a signature is matched, a signature basic event may be issued with a parameter indicating the signature type. Examples of basic events that are "signature basic event" (SBE), include one for a request signature and another for a reply signature. These event parameters can be included in the signature id. The SBE is generally available for the correlation engine.

In one example the signature analysis engine support signature updates. Examples of signature updates include the following: (1) add new signature, (2) remove an existing signature; and (3) change an existing signature definition.

Examples of signature definitions include the following: (1) Identifier—unique id; (2) Severity; (3) Type (Security Signature, Server Technology etc.); (4) Request/Reply Signature; (5) List of patterns and for each its following attributes: (a) Pattern string or regex (if type is regex); (b) Pattern name (can be "bogus" identifier); (c) Patterns type (regular/regular expression); (d) Pattern sequential number; (e) the location in which the patterns should be searched in; (f) whether should check pattern for its boundaries; (g) Whether the pattern must appear or must not appear (i.e. pattern or NOT (pattern)); (6) Definition of Complex Patterns; (7) Weighted Search definition; and (8) Extracted data information.

As noted, a Complex Pattern is a sequence of patterns with relations of words skip or characters skip between them. Examples of various skip relations include: (1) Words skip relation—the relation specifying the number of words that should appear between two numbers; (2) "Up To" words skip relation—specifying that the number of words between the appearances of the provided patterns should be up to the provided number; and (3) "Up To" Characters Skip—specifying that the number of characters between the appearances of the provided patterns should be up to the provided matter.

Signature configuration can also include extracted data information. In a typical example the extracted data information includes two items: (1) Regular expression representing the data that can be extracted from the request/reply; and (2). Search Location: the location that the provided regular expression should be matched against. The matching can be done either from the first appearance found in that location or from the beginning of the location as will be set in the HLD.

An example of the operation of the Signature Analysis Engine is described. Upon startup signatures are loaded from a definition file and updated in a signature database. Upon initialization the following may be done: (1) delete signature: a signature that exist in the database and is not included in the current definition file is deleted; (2) add Signature: a signature that does not exist in the database and is included in the current definition file is added; and (3) update signature: a signature that exists both in the signature database and in the current HML definition file is checked to see whether its definition should be changed. The signature analysis engine can then check the request/reply for signature matches. In one example the signature matching itself may be done according to the following phases: (1) Use the search module (patterns manager) for the search of all specified patterns for all signatures; (2) Only if one or more of the patterns is found, process the results; (3) For each signature, add an appropriate event (SBE) in case the signature is matched.

A signature basic event file can include the following: (1) Id: SIGNATURE; (2) Short Description: "Signature was detected at the request*"; (3) Long Description: "The signature %SIGNATURE-NAME% was detected at the request*"; (4) Change Detection flag: off; (5) Policy Element (for update profile rule): NONE; (6) CE Key: %PARAM_VALUE(SIGNATURE, SIGNATURE_ID)%; (7) Security Event Flag: true. It is noted that in a reply signature basic event the word "request" should be replaced with the word "reply".

Protocol Violation Engine

The collaborative detection module 308 can include a threat detection engine referred to as a protocol violation engine 374. The protocol violation engine 374 protects against attacks that exploit the HTTP and HTTPS protocols to attack Web applications. Web traffic is analyzed by the behavioral analysis engine 370 to ensure that all communication with the application is in compliance with the HTTP and HTTPS protocol definitions as defined by the IETF RFCs. If the behavioral analysis engine 370 determines that there is an anomaly, then the traffic is analyzed by the protocol violation engine 374 to determine the type and severity of the protocol violation. The protocol violation engine 374 provides protection against attacks using the HTTP protocol, for example, denial of service and automated worms.

Session Manipulation Analysis Engine

Another threat-detection engine that can be included in the collaborative detection module 308 is a session manipulation analysis engine 376. Session manipulation attacks are often difficult to detect and can be very dangerous because cybercriminals, such as hackers, impersonate legitimate users and access functionality and privacy data only intended for a legitimate user. By maintaining all current user session information, it is possible to detect any attacks manipulating or hijacking user sessions, including session hijacking, hidden field manipulations, cookie hijacking, cookie poisoning and cookie tampering. For example, a state tree of all user connections may be maintained, and if a connection associated with one of the currently tracked user's session jumps to another user's session object, a session manipulation event may be triggered.

In an embodiment, session manipulation analysis engine 376 can perform passive session tracking where a predefined list of regular expressions that can identify session IDs in requests and replies is defined. A generation process will choose a subset of these session ID definitions as the ones that are used to identify sessions. These session IDs will be searched for in all requests and replies. The session IDs will be extracted from the request using a combination of the request's objects (such as cookies, parameters, etc), and general regular expressions that are used to extract specific session data. Each set of regular expressions defines which part of the request it runs on, and can be used to extract a value and optionally extract up to two names. In addition, if the regular expression is being searched for in the URL, it can also extract the indexes of an expression that needs to be removed from it. Regular Expression Sets can have one of the following types: (1) Param: Includes two regular expressions. One is searched for in the parameter name, and the other in its value; (2) WholeCookie: includes two regular expressions, one is searched for in the cookie name, and the other in its value (the entire cookie value, without additional parsing); (3) CookieParam: includes three regular expressions, and works on cookies that have been separated correctly into names and values, the first expression is on the cookie's name, the second—on the cookie's parameter name, and the third on the cookie parameter's value. (for example, in the cookie header: "Cookie: mydata=lang=heb|sessionid=900" the cookie's name is "mydata", the two parameters are "lang" (with the value "heb") and "sessionid" (with the value 900)); (4) SemiQuery: includes one regular expression that is run on the query that comes after a semicolon (for example, in the URL "/a.asp;$jsessionid$123", the regular expression will run on the underlined part). (5) NormURL: this regular expression runs on the normalized URL and may return indexes, in which case the part of the URL that is between these indexes is removed—this is done to support sessions that are sent as part of the URL but should not be included in the URL when it is learnt by the ALS; (6) Header: includes two regular expressions, one is searched for in the header name, and the other in its value.

Advanced Correlation Engine

In one embodiment, the ACE 310 includes a first input adapted to receive threat-detection results and to correlate the results to determine if there is a threat pattern. The ACE 310 also includes a second input adapted to receive security policies and to determine an appropriate response if there is a threat pattern. The ACE also includes an output adapted to provide correlation results to an event database 314. The correlation engine examines all of the reference events generated by the detection engines. This can be viewed as combining positive (behavior engine/adaption) and negative security models (signature database) with other specific aspects to web application taken into account (session, protocol). As an example consider a typical SQL Injection, at least one if not two behavioral violations will be detected (invalid characters and length range exceeded) and several signature hits may occur (SQL Injection (Single quote and equals) and SQL Injection (SELECT Statement)). Any one of these events on their own will typically be a false positive, but when correlated together, they may provide a high likelihood of an actual attack.

Another example of the correlation engine is seen when the security system is deployed in monitor only mode and an actual attack is launched against the web application. In this example, the security system will correlate the ExitControl engine events (outbound analysis) with the inbound attacks to determine that they were successful and escalate the severity of the alerting/response.

If the ACE 310 confirms a threat, then the security policy for the application, which is provided by a security policy module 312, is checked to determine the appropriate responsive action. The ACE 310 may also communicate its results to the event database 314 where the ACE results are stored. The event database 314 may also be in communication with a distributive detect prevent architecture (DDPA) module 316.

A security policy, or "Policy", defines a configuration of the security system's detection and prevention capabilities for a specific site. A policy defines the attacks and information leakage the system will look for while analyzing traffic and what response actions to take should something be detected. A policy may be specific implementation of a general security policy of the organization or enterprise as it relates to a specific web application. A policy can be defined per application, or it can be defined per site. In one embodiment, a policy contains "BreachMarks" and security events which may be presented to a user in a tree structure that contains groups and sub-groups that organize the security events for the user to view. Users will see in the BreachMarks group all available BreachMarks in the system—there is no list per site, a user simple chooses which BreachMarks to enable for this policy.

In one embodiment a Policy can specify the following configurations. For Inbound Events (Attacks): (1) enable/disable; and (2) actions to take for successful attacks, unsuccessful attacks, attempted attacks, and for information leakage. For Outbound Events (Leakage): (1) enable/disable; and (2) action or actions to be performed upon detection of the data leakage. For BreachMarks: (1) whether the data matching a specified BreachMark is to be masked (i.e., obfuscated) in the logs, in events sent to the logs, and/or in reports; and (2) actions to be taken by the security system in response to an event. The security system can take various actions, including: (1) logging events—event information is written to a database that is accessible by the EventViewer that can display event information; (2) Simple Network Management Protocol ("SNMP") alerts—an SNMP trap can be set that allows the a SNMP message to be generated upon the occurrence of a specified event; (3) reset—a TCP reset can be sent; and (4) block—the attacker can be blocked at the firewall. It is noted that logging an event, or any other desired action, can be the default action for an event that does not have any action identified (e.g. new event, event that was previously disabled).

In one embodiment, a single Policy can be applied to a specific site. In addition, specific policy may be applied to multiple sites. If an "applied" policy is updated, it will remain "applied", and the updates will take effect in all sites. Users may create custom BreachMarks to define patterns for sensitive information within their organization. In addition a number of pre-defined policies providing configurations tuned to specific vertical markets and levels of acceptable risk can be provided to the user. A "standard policy" can be setup to serve as the default policy. In the event that a user does not "assign" a policy to an application, this default policy can be used. Also, standard policies may be updated and the updates can be distributed to the user. Further, users may create their own custom policies by modifying pre-defined policies in the Policy Manager.

Policies can be imported and exported thereby allowing users to copy policies from one system to another. Typically the security policy module 312 will be responsible for the following tasks: (1) loading/updating a policy from a database, (2) loading/saving policies from/into the database, (3) loading/saving sites-policies associated from/into a configuration file, (4) loading/saving sites-policies association from/into the database, (5) updating relevant components on configuration changes, and (6) performing the configured action in response to a correlated event.

When detecting security events, the policy module 312 receives notification on detected events. Upon receipt of a security event, the policy module 312 checks what responsive action should be taken. When there has been an event the policy module 312 enables signatures that participate in the newly enabled security events. In addition, the policy module 312 may disable signatures that participate only in recently disabled security events. To accomplish this, the policy module 312 determines which signatures are participating in the newly enabled security events and then requests the signatures to add them.

As shown in FIG. 3, the responsive action may be provided to the DDPA module 316 by the security policy module 312. The DDPA module 316 may also receive information from the ACE 310 via the event database 314. The DDPA module 316 may, for example, alert, log, or block a threat by coordinating distributed blocking with a network component, not shown, such as a firewall, Web server, or Security Information Manager (SIM).

The event database 314 may also be in communication with an event viewer 318, such as a terminal, thereby providing information about events to a network administrator. The event database 314 can also communicate input to a report generating module 320 that generates reports about the various events detected.

Adaption Module

An adaption module 350 monitors Web traffic and continually updates and tunes a security profile module 352 that maintains security profiles of applications. The updated security profiles are communicated to the collaborative detection module 308 so that a current security profile for an application is used to determine if there is a threat to the application. Following is a more in-depth description of aspects and features of the Web application security techniques.

Management Console

Figure 4:
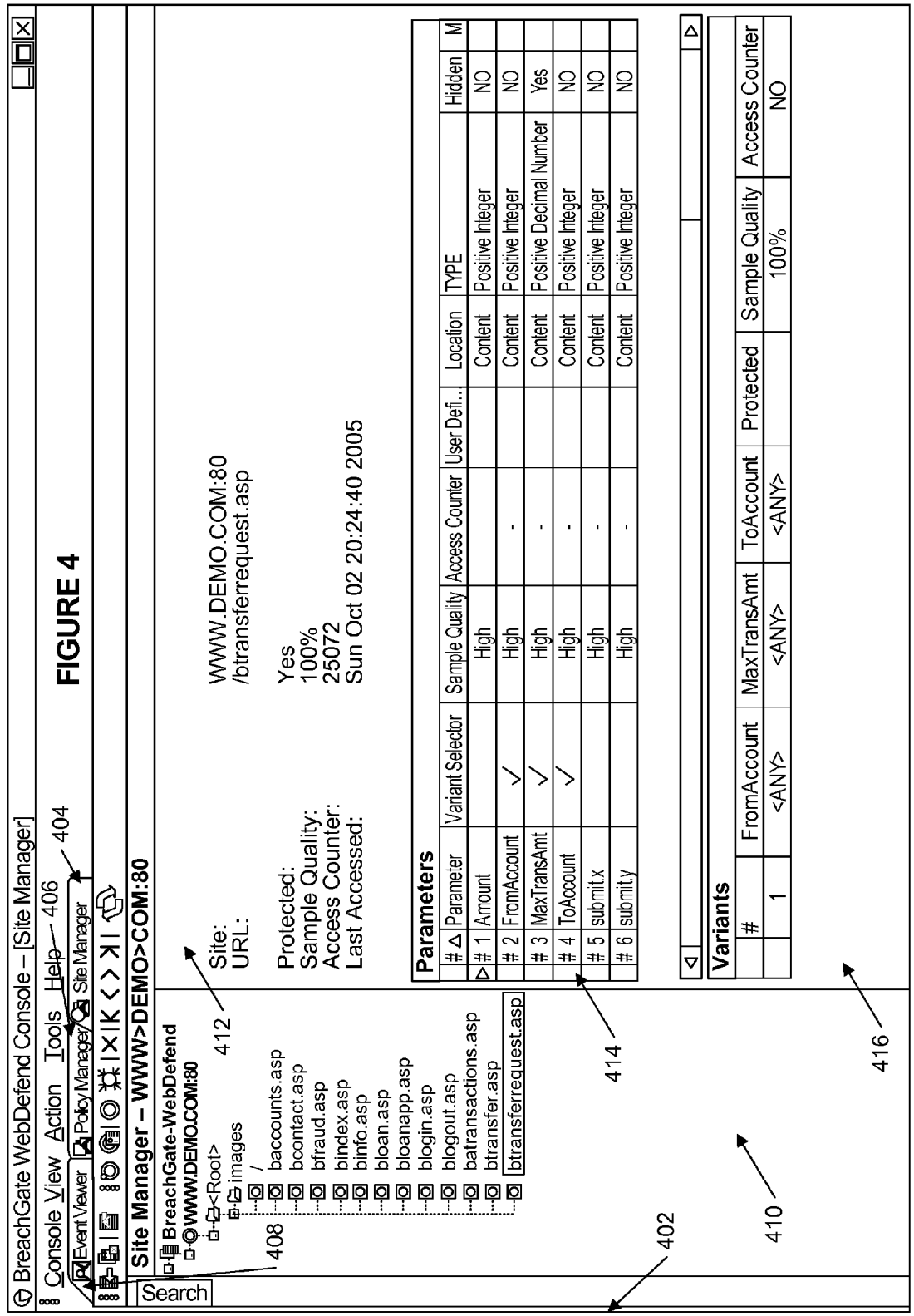
FIG. 4 is an example display, generated by the management console, designed to enable application security management according to an embodiment.

A management console can be used to generate displays of information to a network administrator on an event viewer 318 of FIG. 3. FIG. 4 is an example display 402, generated by the management console, designed to enable intuitive application security management. As shown in FIG. 4, the display 402 generated by the management console can include tabs for a site manager 404, a policy manage 406, and an event viewer 408. In FIG. 4, the site manager tab 404 has been selected. The site manager display 404, generated by the management console, provides a user interface for interacting with an application's profile, as developed and stored in the adaption modules 350 and application profile 352 of FIG. 3. The site manager display 404 depicts an application's security profile or model in a hierarchical tree structure. Nodes on the tree represent URL's within the application profile.

The site manager display 404 can also include a directory window 410 allowing the network administrator to navigate through the application profile. The directory window 410 can be a site map organized in a hierarchy to provide an intuitive interface into the organizational structure of the web application.

The site manager display 404 also includes a status window 412 where information about the status of the Web application protection system is displayed. The Status Window 412 can display the status of the attack detection engines and performance and access statistics.

There is also a parameters window 414 where the status of various parameters of the Web application protection system is displayed. The parameter window 414 can list each user entry field or query in the selected URL. Each parameter entry includes the quality of the statistical sample size for this field, validation rules for determining the correct behavior of user entries in the field, and other characteristics.

The site manager display 404 can also include a variants window 416 where information about variants that are detected can be displayed. The variant window 416 can list the response pages possible through various valid combinations of user parameters selected in the request. For example, if a page had a list of products that a user could select, the page would have variants for each different possible product in the list. Variants include information used to uniquely identify the response page.

Figure 5:
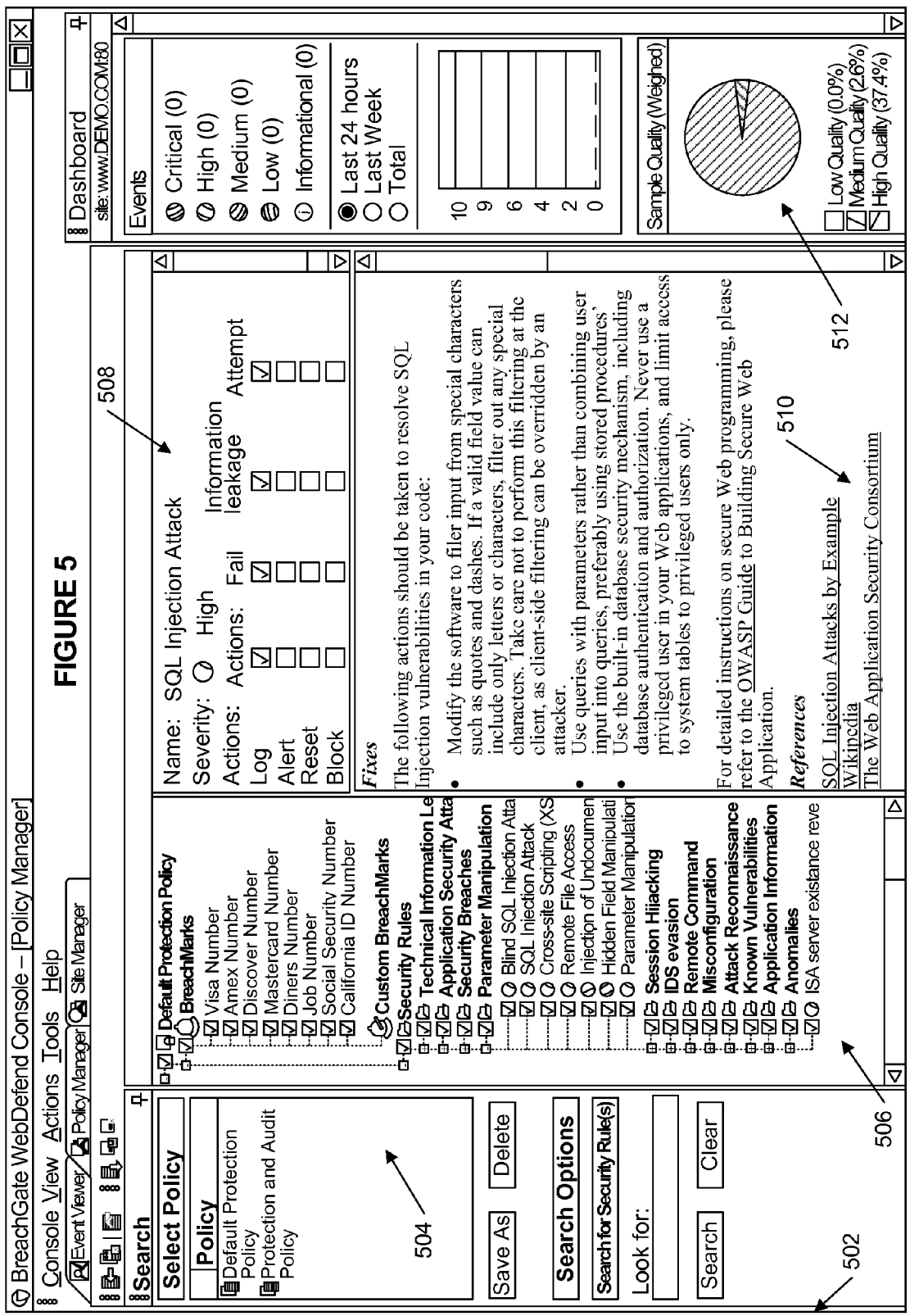
FIG. 5 is a display of an example policy manager display generated by the manager console according to an embodiment.

FIG. 5 is an example policy manager display 502 generated by the management console. Within the Web application security system, a policy describes the configuration options for the detection engines as well as what responsive action to take when an event is detected. A policy lists the security events that the Web application security system will monitor and the responsive action to be taken if the event is detected. The policy manager display 502 enables administrators to view and configure security policies for a Web application security system, such as the policies stored in the security policy module 312 of FIG. 3. For example, the policy manager display 502 can provide a list of events organized into categories within a tree structure. Each event may be enabled or disabled and responsive actions for each event can be configured such as logging the event, sending a TCP Reset or firewall blocking command, or setting an SNMP trap.

Policies can be standard, out-of-the-box, policies that are configured to provide different levels of protection. Administrators can modify these standard policies in the Policy Manager to create application-specific policies. In addition, administrators can design their own policy from scratch.

The Web application security system can include special patterns, referred to as BreachMarks, which are used to detect sensitive information such as social security numbers or customer numbers in outgoing Web traffic. The BreachMarks, which can be included in the security policies, can be customized to a particular data element that is sensitive to an enterprise's business. BreachMarks allow organizations to monitor and block traffic leaving the organization which contains patterns of data known to represent privileged internal information.

The policy manager display 502 can be used to define and manage the configuration of the Web application security system mechanisms and includes the ability to fine-tune threat responses on a granular level. As shown in FIG. 5, the policy manager display includes a policy window 504 where a network administrator can select a desired policy for use by the Web application security system. The policy manager display 502 also includes a navigation window 506 so that different types of security issues can be tracked and monitored. There is also a policy modification window 508 that allows an administrator to set various responses to a security attack. In the example of FIG. 5, the administrator is able to set how the Web application security system will respond to an SQL injection attack. The policy display 502 also includes a recommendation window, where suggestions for how to modify a network's operation to better prevent attacks are provided. There is also a dashboard window 512 that provides the administrator summary information about the types and severity of various events identified by the Web application security system.

Figure 6:
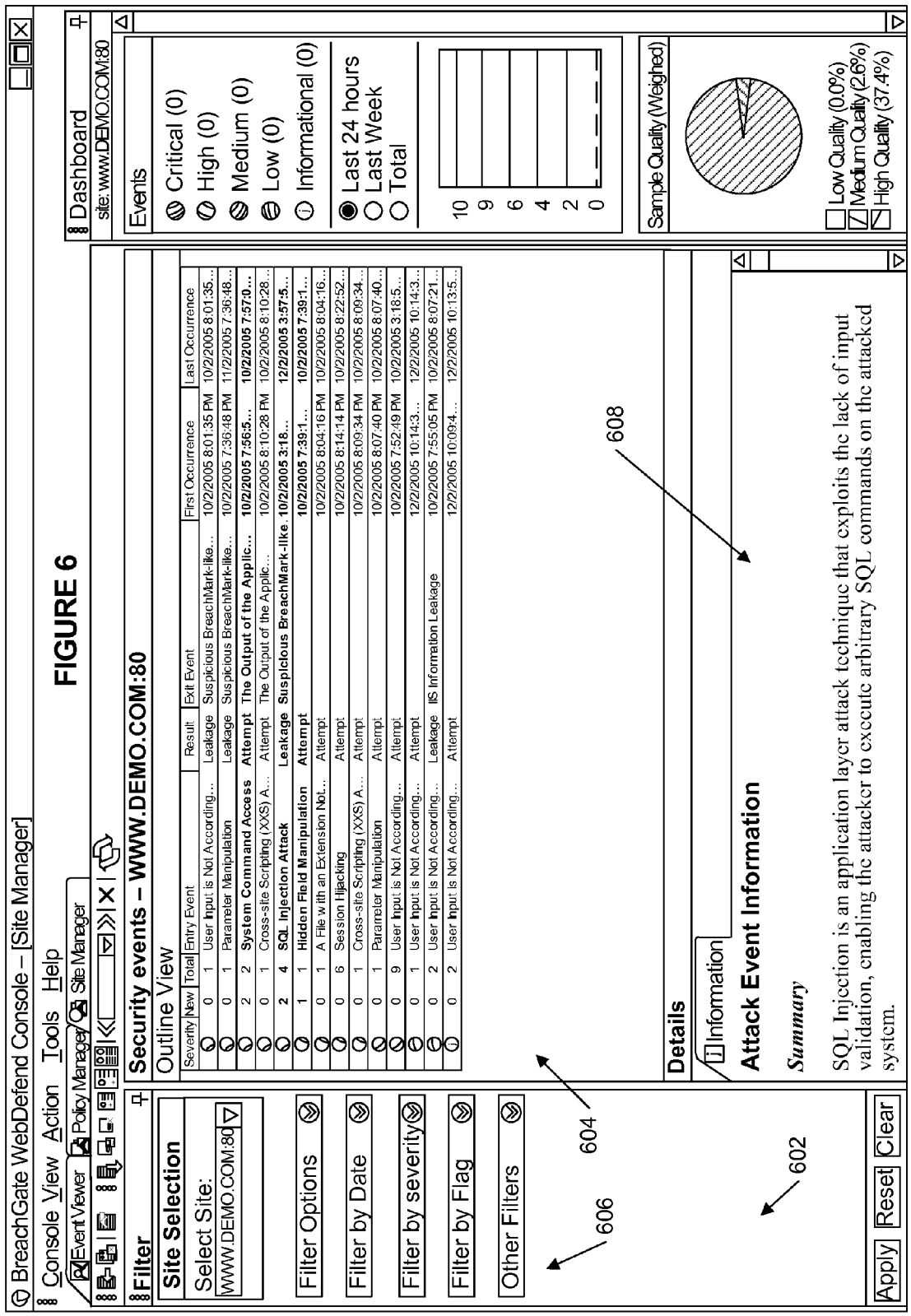
FIG. 6 is a display of an example event viewer display generated by the manager console according to an embodiment.

FIG. 6 is an example event viewer display 602, generated by the management console, as might be displayed on the event viewer 318 of FIG. 3. Within the Web application security system, the event viewer display 602 console can include a real-time event analysis module. The event viewer display 602 includes an event detection window 604 with a list of events detected by the Web application security system. This list may include the date, the URL affected, and names both the entry event for the incoming attack as well as any exit event detected in the server's response to the attack.

In section 606, each selected event may be described in detail, including an event description, event summary, and detailed information including threat implications, fix information, and references for more research. In addition, the event viewer may provide administrators a listing of the reference events reported by the detection engines to determine this event has taken place, the actual HTTP request sent by the user and reply sent by the application, as well as a browser view of the response page. This detailed information allows administrators to understand and verify the anomaly determination made by the various detection engines.

The event viewer display 602 can also include a filter window 606 where an administrator can setup various filters for how events are displayed in the event description window 604. There is also a detail description window 606 where detailed attack information is provided to the administrator. The event filter display 602 may include filters for date and time ranges, event severity, user event classifications, source IP address, user session, and URL affected.

Returning to FIG. 3, the Web application security system can also provide a full range of reports 320 for network administrators, management, security professionals, and developers about various aspects of the security of a Web application. For example, reports can provide information about the number and types of attacks made against corporate Web applications. In addition, reports can include information with lists of attacks and techniques to assist in preventing them from occurring again. Also, application developers can be provided reports detailing security defects found in their applications with specific recommendations and instructions on how to address them.

Usage Analysis Engine

Still another threat detection engine that can be included in the collaborative detection module 308 is a usage analysis engine 378. The usage analysis engine 378 provides analysis of groups of events looking for patterns that may indicate that a site is being examined by a potential attacker. Targeted Web application attacks often require cyber-criminals to research a site looking for vulnerabilities to exploit. The usage analysis engine 378, over time and user sessions, can provide protection against a targeted attack by uncovering that a site is being researched, before the site is attacked. The usage analysis engine 378 correlates events over a user session to determine if a dangerous pattern of usage is taking place. An example of this analysis is detecting a number of low severity events resulting from a malicious user probing user entry fields with special characters and keywords to see how the application responds. These events may not raise any alarms on their own but when seen together may reveal a pattern of usage that is malicious. Another example of this analysis is detecting brute force login attempts by correlating failed login attempts and determining that threshold has been reached and thus, the user may be maliciously trying to guess passwords or launching a dictionary attack of password guesses at the web application. Another example of this analysis is detecting scans by security tools when an abnormal amount of requests are received in the same session. Yet another example of this analysis is detecting http flood denial of service attacks when an abnormal number of duplicate requests are received in the same session. This analysis can be easily extended to detect distributed denial of service attacks by boot networks correlating multiple individual denial of service attacks.

Exit Control Engine

Yet another threat detection engine that can be included in the collaborative detection module 308 is an exit control engine 380. The exit control engine 380 provides outbound-analysis of an application's communications. While incoming traffic is checked for attacks, outgoing traffic may be analyzed as well. This outgoing analysis provides essential insight into any sensitive information leaving an organization, for example, any identity theft, information leakage, success of any incoming attacks, as well as possible Web site defacements when an application's responses do not match what is expected from the profile. For example, outgoing traffic may be checked to determine if it includes data with patterns that match sensitive data, such as a nine digit number, like a social security number, or data that matches a pattern for credit numbers, drivers license numbers, birth dates, etc. In another example, an application's response to a request can be checked to determine whether or not it matches the profile's variant characteristics.

Web Services Analysis Engine

Another threat detection engine that can be included in the collaborative detection module 308 is a Web services analysis engine 382. The Web services analysis engine 382 provides protection for Web Services that may be vulnerable to many of the same type of attacks as other Web applications. The Web services analysis engine 382 provides protection from attacks against Web services such as XML viruses, parameter tampering, data theft and denial of Web services attacks.

Threats detected by any of the above threat detection engines in the collaborative detection module 308 may be communicated to the advanced correlation engine 310 where they are analyzed in context of other events. This analysis helps to reduce false positives, prioritize successful attacks, and provide indications of security defects detected in the application. In one embodiment, the advanced correlation engine 310 can be based upon a positive security model, where a user's behavior is compared with what is acceptable. In another embodiment, the advanced correlation engine 310 can be based upon a negative security model, where a user's behavior is compared to what is unacceptable. In yet another embodiment, the advanced correlation engine 310 can be based upon both models. For example, the user's behavior can be compared with what is acceptable behavior, a positive model, and if the behavior does not match known acceptable behavior, then the user's behavior is compared with what is known to be unacceptable behavior, a negative model.

Example Embodiments

Embodiments of the Web application protection system can be used to prevent various types of attacks targeting Web applications, such as SQL injection attacks, session hijacking, excessive access rate attacks, and phishing and leeching. SQL injection attacks exploit security vulnerabilities in the database layer of Web applications by fooling an application into accepting a string from the user that includes both data and database commands where a string containing just data is expected. Session hijacking attacks focus on weaknesses in the implementation of session mechanisms used in Web applications. Attackers can manipulate these mechanisms to impersonate legitimate users in order to access sensitive account information and functionality. Excessive access rate attacks deluge a Web site or Web server with a large number of requests in a short period of time in order to negatively impact the performance of the Web site. Phishing is a type of internet fraud which typically involves the practice of obtaining confidential information through the manipulation of legitimate users. Leeching (also known as "bandwidth theft") is a variation of phishing in which an external server refers to images stored on a local server.

Techniques for preventing SQL injection and session hijacking attacks are described in related U.S. patent application Ser. No. 11/532,060, which is herein incorporated by reference in its entirety, and techniques for detecting and blocking excessive access rate attacks are described in related U.S. patent application Ser. No. 12/697,049, which is herein incorporated by reference in its entirety. Techniques for detecting phishing and leeching are provided as was as techniques for detecting phishing vulnerabilities. According to an embodiment, the Web application protection system can detect and prevent multiple types of attacks simultaneously.

Detecting Phishing and Leeching

Phishing is a type of internet fraud that typically involves the practice of obtaining confidential information through the manipulation of legitimate users. Typically, the confidential information is a user's password, credit card details, social security number, or other sensitive user information. Phishing may be carried out by a malicious party masquerading as a trustworthy person, web site, or business. In one approach, a message, such as an email or instant message, may be sent to an unsuspecting user. The malicious party creates and sends a message that appears to be from a legitimate source, such as the recipient's bank, that attempts to get the recipient to divulge confidential information. For example, a malicious party may send an email message purporting to be from the recipient's bank that states that unless the recipient provides confidential information, such as the recipient's account number, password or pin code, and/or the recipient's social security number, the recipient's account may be closed or blocked. The message may include a link or other mechanism that links to an illegitimate source, such as a web page, where the recipient of the message is prompted to enter confidential information.

In another approach, a web page is that may appear to be legitimate is provided to the user is duplicated. However, the duplicated web page is designed to trick the user into providing their confidential information. Such web pages may relate to account log-in sites, credit card entry sites, or the like. For example, a phisher can design a web page that mimics the login screen of a bank's website.

The false site typically contains a request for the individual's password, credit card, social security number, or other personal information. This information, if given by the individual, is then submitted to the person posing as the bank or popular website. Once the unsuspecting user enters their information, the phisher may be able to obtain the sensitive information and use it to create fake accounts in a victim's name, ruin the victim's credit, make purchases under the victim's name, sell the information to others, perform acts under the victim's identity, or even prevent the victim from accessing their own money and/or accounts.

Leeching is a variant of phishing that is also referred to as "bandwidth theft." Typically, in a false website created by a phiser, the false website is created by duplicating and altering the HTML code of a legitimate web site. The altered HTML document often still references files, such as images, that are located on the server of the legitimate web site. In leeching, an external server refers to images that are stored on a local server. Visitors to the external site see the images as if they were a part of that site, whereas, in fact, the bandwidth and computing resources consumed are those of the referenced local server. This can lower the hosting costs of the external server while placing an increased load on the local server.

In an exemplary embodiment, the phishing and leeching detection technique described herein can be implemented in the application protection module 128 of FIG. 1. According to some embodiments, the phishing and leeching techniques can be implemented based on the inspection of referrer field ("HTTP_REFERRER" or "HTTP_REFERER") and the host field (HTTP_HOST) included in the HTTP header of an HTTP request. A web server can sometimes determine the source of a request for content originates by examining the contents of the HTTP referrer field.

The referrer field of the HTTP header allows a client (e.g., the computer system requesting the content) to specify the address (the Uniform Resource Locator or "URL") of the page from which the request was generated. For example, if a request is received from a bank website the data in the bank field might appear as "http://www.bigbank.com/main.htm" where "www.bigbank.com" represents the host requesting the content and "main.htm" refers to the page from which the request is being made. The host field of the HTTP header can specify the server and in some instances the port number from which the content is being requested.

It should be appreciated that the phishing and leeching detection methods described herein may be implemented by in-line or out-of-line devices. Monitoring phishing and leeching protects against attacks that exploit the HTTP and HTTPS protocols to attack Web applications. Inspection of a HTTP referrer header follows.

When a user visits a web page, the browser first downloads an HTML document, which includes the textual content of the page. The HTML document includes references to other files that are used by the browser to display the page. These files include images, script files and style sheet files. For example, the following tag in the HTML document can be used fetch an image to be placed on a page:

<img src="http://server/image.jpg">

The included files can reside on any server, not just the server from which the HTML document was fetched. The user's browser will contact the additional server to fetch the required files without going through the server where the original HTML document resides. Unless specifically designed as such, applications do not normally serve images, scripts or other included files referred to by HTML documents hosted at remote servers. One example of an application designed to serve remote included files is a banner advertising server.

In an embodiment, to detect phishing and leeching, HTTP referrer header field is inspected to determine if the referring source is an external source whenever access to files is requested from a local server, e.g., application server 132 in FIG. 1. In an exemplary embodiment, adaption module 350 inspects the HTTP referrer header field to determine if the referring source is an external source. As described above, an ALS may perform the HTTP referrer header inspection.

Alternatively, collaborative detection module 308 may inspect the HTTP referrer header to determine if the referring source is an external source. If collaborative detection module 308 determines that HTTP referrer header indicates an external source, collaborative detection module 308 triggers an event, whereby ACE 310 communicates the event to the event database 314. Additionally, a GUI may in communication with the event database and be employed to provide detailed event analysis results as well as provide detailed and summary level reports that may be used for compliance and audit reports. In some embodiments, the GUI includes an event viewer 318 and report generating module 320. It should be appreciated that the source IP address of the event belongs to an innocent user who was unknowingly referred and not to the external referring web site.

Figure 7:
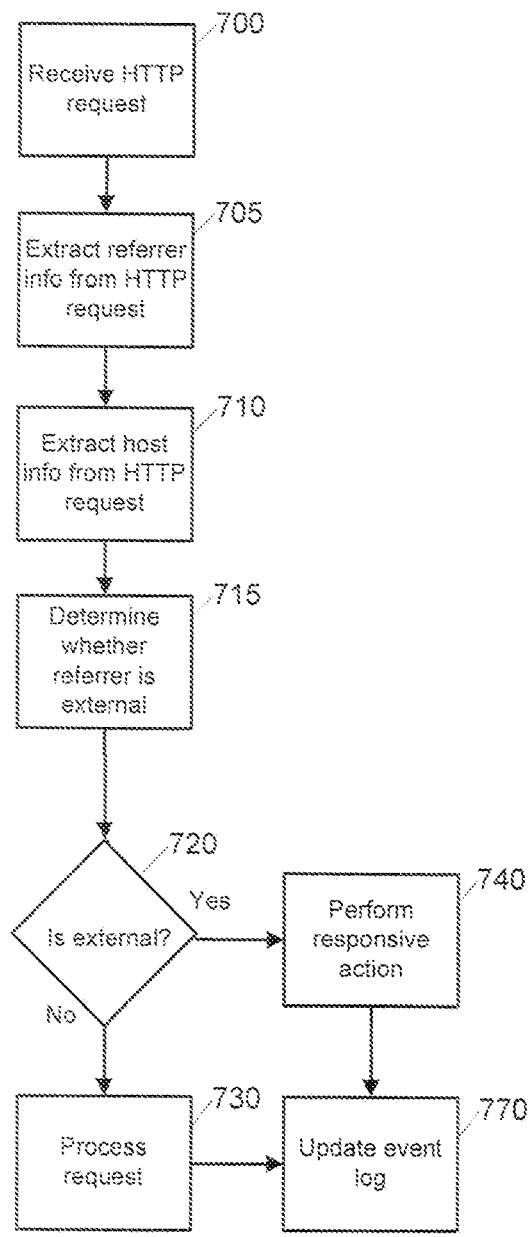
FIG. 7 is a flow chart illustrating an example technique for detecting phishing according to an embodiment.

FIG. 7 is a flow chart illustrating an example technique for detecting phishing and/or leeching activities according to an embodiment. In an embodiment, the technique illustrated in FIG. 7 can be implemented in application protection module 128. In another embodiment, the collaborative detection module 308 and the ACE 310 can be used to implement this technique.

An HTTP request is received (step 700). The data from the referrer field of the HTTP request header is extracted from the HTTP request (step 705) and the data from the host field of the HTTP request header is extracted from the HTTP request (step 710). As described above, the referred field can be used to specify the URL of the page from which a request originated, and the host field is used to specify the host from which content is requested and can also include the port number to which the request is directed.

Figure 8:
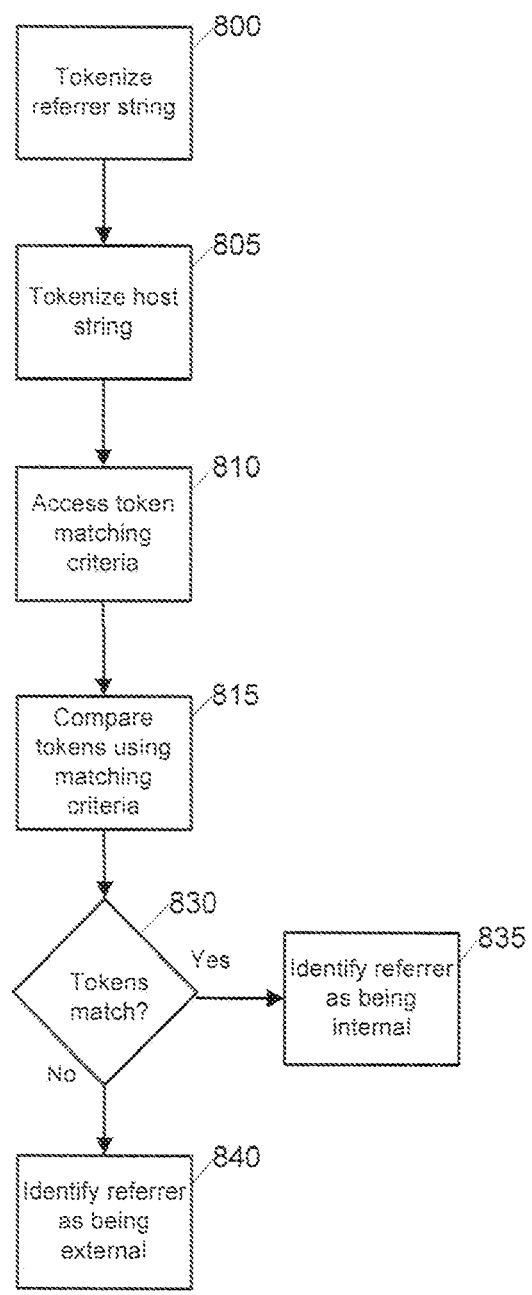
FIG. 8 is a flow chart illustrating an example technique for determining whether a referrer is an external source according to an embodiment.
Figure 9:
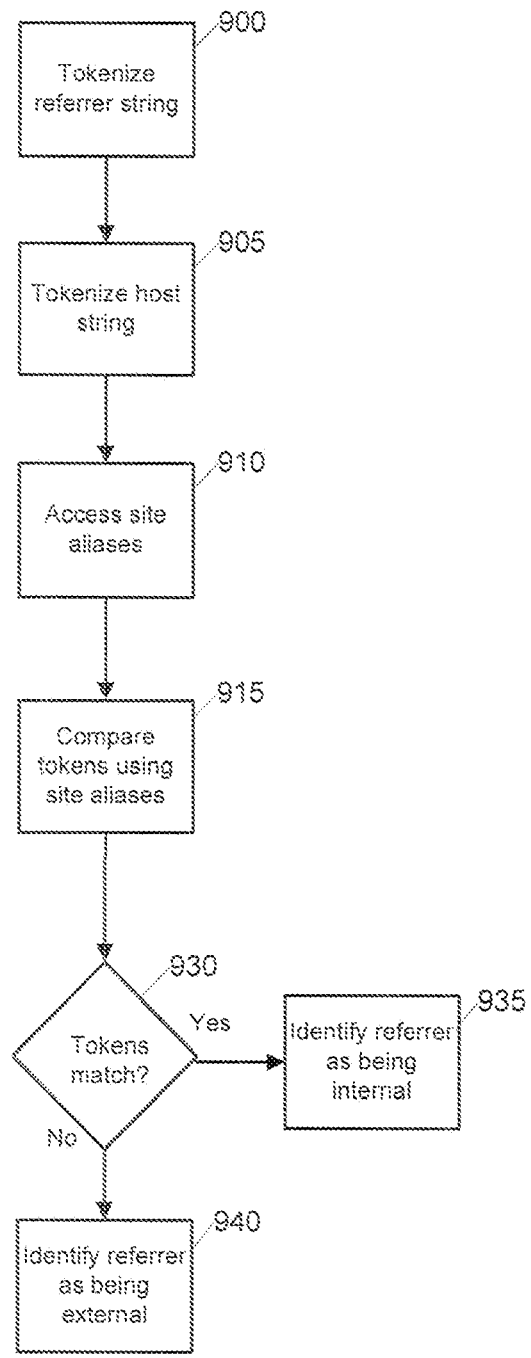
FIG. 9 is a flow chart illustrating another example technique for determining whether a referrer is an external source according to an embodiment.

Once the referrer and host information has been extracted from the referrer field of the request, a determination is made whether the referrer is an external host (step 715). For example, the referrer may be a web page hosted on an external server, but the requested content is hosted on a local web server, such as web server 126. Techniques for determining whether the referrer is an external source are illustrated in FIGS. 8 and 9 below.

If the source of the request was an external source, then a responsive action is performed (step 740). According to an embodiment, the security policy module 312 maintains a security profile that defines a set of one or more responsive actions to be taken in response to phishing or leeching activity. In an embodiment, the security policy module 312 is checked to determine the appropriate responsive action to perform in the event that a request for content is received from an external source. In an embodiment, the request received from the source is blocked to prevent the request from being received at the web server. In other embodiments, the request can still be processed, but event information will be captured that can be used to generate phishing activity reports. For example, the event database 314 can be updated to indicate that the request received from the source was blocked and/or other responsive actions were performed in response to possible phishing activity (step 770). Information related to the request, such as the source of the request, the requested action or content, the date and/or time that the data was requested, and the reason that the request was deemed to be possible phishing or leeching activity may be included in the entry in the event database. Event viewer 318 can be used to view event data, and an administrator can view information about which requests were blocked or for which other responsive actions were taken using the event viewer 318. According to an embodiment, the administrator can access reports that indicate which external sources were accessing which content on the local server, and the administrator can configure the system to block the external source from accessing the content if the external source has not already been blocked and/or take other actions.

If the source of the request was not an external source (e.g., the request originated from web server 126), the HTTP request is processed (step 730). For example, the request may be forwarded to the web server to access content referenced in the request. In an embodiment, additional threat detection techniques can be applied HTTP request before the request is processed. According to an embodiment, the receipt and/or processing of the event may be added to the event database 314 (step 770). Events added to the event database 314 can be viewed using event viewer 318.

In one embodiment, the comparison of HTTP referrer header and host header is done for the last two tokens in the domain name. For example, if the referrer header is www.site.com and the host header is images.site.com, an event is not generated because the last two tokens, site and corn, are the same. However, if the last two tokens differ, such as the referrer header ends in org and the host header ends in corn, then an event is triggered.

It should be appreciated that some international sites, an event is not generated if the referring site and the host are in the same country. For example, if the domain name includes an additional token (e.g., www.name.co.uk), the referrer header is www.external.co.uk and the host header is www.n-ame.co.uk, the two last tokens are identical and no event is issued. If, however, the referrer header is www.external.com, an event is generated.

FIG. 8 is a flow chart illustrating an example technique for determining whether a referrer is an external source according to an embodiment. The method of FIG. 8 can be used in conjunction with the method illustrated in FIG. 7 to make the determination described in step 715. In an embodiment, the technique illustrated in FIG. 8 can be implemented in application protection module 128. In another embodiment, the collaborative detection module 308 and the ACE 310 can be used to implement this technique.

The referrer string extracted from the HTTP_REFERRER field of the HTTP request header is tokenized to facilitate the comparison of the referrer information to the host information extracted from the host field of the HTTP request header (step 800). In an embodiment, the referrer string is extracted from the HTTP request header in step 705 of the process illustrated in FIG. 7. For example, if the referrer string is "www.bigbank.com" the string can be broken up into three tokens: "www," "bigbank," and "com."

The host string extracted from the HTTP_HOST is tokenized (step 805). In an embodiment, the referrer string is extracted from the HTTP request header in step 710 of the process illustrated in FIG. 7. For example, if the host string is "www.bigbank.com" the string can be broken up into three tokens: "www," "bigbank," and "com."

Matching criteria to be used for determining whether the referrer and the host from the HTTP request match is accessed (step 810). In an embodiment, the database server 134 can store the matching criteria created by an administrator using the policy manager display 502 in a persistent data store such as a relational database, and the matching criteria can then be retrieved from the persistent data store via database server 134.

In an embodiment, the matching criteria used for matching tokens can be configured by an administrator. For example, a rule can be created that indicates the number of tokens be used to determine whether an external source is requesting content. For example, if the www.external.co.uk and the host header is www.name.co.uk and the last two tokens are compared {"co" "uk"} the tokens match and the request would be processed. However, if the rules indicated that three tokens should be used, the referrer string tokens {"external" "co" "uk:} do not match the set of host string tokens {"name" "co" "uk"}. Therefore, in this example, the rules indicate that the request has been received from an external source and one more responsive actions may be taken as a result.

According to an embodiment, an administrator can define different matching rules for different content. For example, different access rules might be applied for image content versus text content. An administrator might want to define rules that prevent image content from a local server from being included in web pages from an external server. Not only can this prevent leeching but can also discourage a phisher from simply creating a web page that is simply a copy of a legitimate web page that includes references to content stored on the local server. Each time the legitimate website was updated, the phisher would need to make similar updates to his website in order to maintain an aura of legitimacy. He would no longer simply be able to leech updated content from the local website by including references to that content in the phishing site.

In another embodiment, the matching criteria can specify that tokens not related to the hostname are ignored and the remaining tokens are compared. For example, if the referrer string from the request is www.external.co.uk and the host string from the request is www.name.co.uk, the referrer string can be tokenized to produce the follow tokens {"www" "external" "co" "uk"} and the host string can be tokenized to produce the follow tokens {"www" "name" "co" "uk"}. The "www," "co," and "uk" tokens can be ignored for the purpose of the comparison and the host name related tokens "external" and "name" can then be compared. In this example, the host name token does not match in the referrer and host strings extracted from the HTTP request header, and as a result, one more responsive actions may be taken as a result. However, if the if the referrer string from the request is www.name.co.uk and the host string from the request is www.name.com, the referrer string can be tokenized to produce the follow tokens {"www" "name" "co" "uk"} and the host string can be tokenized to produce the follow tokens {"www" "name" "com"}. The "www," "co," "uk," and "com" tokens can be ignored for the purpose of the comparison, and the host name related tokens "name" can be compared. In this example, the host names match, therefore the HTTP request can be processed (as long as the system did not detect any another malicious activity related to the request).

A determination is made whether the tokens from the referrer string and the host string based on the matching criteria (step 830). If the tokens match, the referrer is identified as being internal (step 835). Otherwise, the referrer is identified as being external (step 840). The handling of the HTTP request and any responsive actions that may be taken based on whether the referrer is external are described above with respect to FIG. 7.

In one embodiment, the comparison of HTTP referrer header is performed against the host string included in the HTTP request header and any site aliases, e.g., nicknames associated with local host or hosts to determine whether a request has originated from an external source.

In an embodiment, the HTTP referrer header is compared to the host header as described above with respect to FIG. 8. In some embodiment, the HTTP referrer header is compared against any site aliases. For example, in some embodiments, the www prefix will be ignored so that www.site.com and site.com match, but not other prefixes. It should be understood that both the host header comparison and site alias comparison may be modified as desired. Additionally, the site alias comparison may be used to eliminate false positives by defining a referring site as a site alias.

FIG. 9 is a flow chart illustrating another example technique for determining whether a referrer is an external source according to an embodiment. The technique illustrated in FIG. 9 uses domain aliases when determining whether a request has originated from an external source. The method of FIG. 9 can be used in conjunction with the method illustrated in FIG. 7 to make the determination described in step 715. In an embodiment, the technique illustrated in FIG. 9 can be implemented in application protection module 128. In another embodiment, the collaborative detection module 308 and the ACE 310 can be used to implement this technique. According to some embodiments, a determination whether a request has originated from an external source can be made using both the techniques illustrated in FIGS. 8 and 9. In one embodiment, if either one of the techniques illustrated in FIGS. 8 and 9 identifies a request as having originated from a local source rather than an external source, the source of the request is treated as a local rather than external source.

The referrer string extracted from the HTTP_REFERRER field of the HTTP request header is tokenized to facilitate the comparison of the referrer information to the host information extracted from the host field of the HTTP request header (step 900). In an embodiment, the referrer string is extracted from the HTTP request header in step 705 of the process illustrated in FIG. 7. The tokenization of the referrer string can be performed in a similar fashion to the tokenization of the referrer string in step 800 of FIG. 8 described above.

The host string extracted from the HTTP_HOST is tokenized (step 905). In an embodiment, the referrer string is extracted from the HTTP request header in step 710 of the process illustrated in FIG. 7. The tokenization of the host string can be performed in a similar fashion to the tokenization of the referrer string in step 805 of FIG. 8 described above.

Domain alias to be used for determining whether the referrer and the host from the HTTP request match is accessed (step 910). In an embodiment, the site aliases can be configured by an administrator. In an embodiment, domain aliases can be defined on a host by host basis or applied to all hosts. In an embodiment, an administrator can define site aliases using the policy manager display 502 illustrated in FIG. 5 described above. In an embodiment, the database server 134 can store the domain aliases created by using the policy manager display 502 in a persistent data store such as a relational database, and the domain aliases can then be accessed from the persistent data store via database server 134.

For example, the various aliases can be defined that will be treated as equivalent. For example, an alias can be defined to ignore different suffixes that might be appended to a host name when comparing the referrer string to the host string. For example, a set of domain aliases can be defined that ignore the suffix "www" that is commonly appended to domain names in URLs. Therefore, if the if the referrer string from an HTTP request is www.name.co.uk and the host string from the request is name.co.uk, the referrer string can be tokenized to produce the follow tokens {"www" "name" "co" "uk"} and the host string can be tokenized to produce the follow tokens {"name" "co" "uk"}.

In another example, a web site may provide various services such as mapping, searching, and/or other content and each of these services can be associated with a different domain name. For example, a website that provides mapping and translation services might assign the domain name "maps.name.com" for the mapping services and "translate.name.com" for the translation services. The website provider can use aliases to allow web pages coming from the "maps.name.com" domain to request content from the "translate.name.com" domain and vice versa by defining an alias for the suffix "translate" and for the suffix "maps."

A determination is made whether the tokens from the referrer string and the host string based on the domain aliases (step 930). If the tokens match, the referrer is identified as being internal (step 935). Otherwise, the referrer is identified as being external (step 940). The handling of the HTTP request and any responsive actions that may be taken based on whether the referrer is external are described above with respect to FIG. 7.

As described above, in some embodiments, a list of external HTTP referrer headers which reference files on the local server is saved in the event database 314. The report generating module 320 can be configured to generate reports that provide a list of which external sources are referencing files on the local server. The report can include the referrer URL extracted from the HTTP request header to identify the source of the requests. In some embodiments, the report can be generated in an online format and displayed in the management console. The reports can include hyperlinks to the referrer that allows an administrator to click on the hyperlinks to view the website associated with an external source that is referencing content on the local server. This information can be used by the administrator to determine whether the administrator needs to attempt to contact the administrator or owner of the suspected phishing site owner to check if whether the logged abuse is accidental and/or to determine whether legal action is desirable or warranted. According to some embodiments, the report generation module can also be configured to generate a report that lists the local users that have fallen for the phishing scheme and have had confidential information, such as passwords or account information compromised. Furthermore, the reports can be used as evidence that the external source is a phishing site and the information gathered can be used to inform the service provider hosting the phishing site what is occurring so the site can be shut down and/or to provide evidence for legal proceedings against the alleged phisher.

In addition to phishing and leeching detection, content theft may also be detected by the present system and methods. In content theft, an external server includes information copied from the local server in order to redirect traffic and generate revenues from the content. Similar to phishing, the external server can include files (e.g., images) on the local server. Thus, by comparing the information on the external server with the local server, content theft may be detected. In some embodiments, the administrator can be alerted to possible content theft using the techniques described above and can then compare the information on the external server with the local server to determine whether content theft has occurred.

Detecting Phishing Vulnerability

As described above, a phisher can use a falsified email or website purporting to be from a legitimate business to trick legitimate users into divulging confidential information. In yet another approach, a phisher may use a redirect facility from a legitimate website to redirect the user to a false site. A redirect facility is a function of an application (e.g., web site) that transfers users to different pages within or outside of the application. Through the use a redirect parameter (the parameter used to provide the redirect function with the URL to redirect to), the phisher may redirect the user to the false site due to a vulnerability in the legitimate website. For example, a request for redirection may appear as follows:

http://site/redirect.php?to=http://fakesite/target.html

In the above example, the user may have initially been at a legitimate web site, site/home.htm. When the user clicked on the redirect facility (e.g., through a redirect link), the user was redirected to a webpage on the fake site, fakesite/target.html.

Referring back to FIG. 1, in an exemplary embodiment, a user 102 accesses a legitimate web site (e.g., site) being protected by Web application protection module 128 via wide area network 104. The user 102 clicks on a redirect link on the legitimate web site. The redirect link sends a request back to web server 126 that the user 102 be directed to another page or site, such as fakesite/target.html. Web server 126 sends a query to the redirect page or site (e.g., target.html). The redirect page or site then sends the requested information to Web server 126 so that user 102 may access the redirect page or site, target.html on the fakesite domain.

Because the user clicked on a link from a legitimate site, the user may not be aware that they have been redirected away from the legitimate site or may believe that the site to which they have been redirected is affiliated with the legitimate site and is therefore also legitimate.

Redirect facilities or links are common and can be used in numerous legitimate ways to improve the web browsing experience, such as:

Returning a user from a login page to a web page that required authentication so that the user does not have to manually reenter the address of the web page or browse back to the web page after logging in.

Monitoring use of outbound clicks, e.g., by presenting the user with a local URL that redirects to an external resource.

Continuing shopping after a visit to the shopping cart page.

Due to the common usage of redirects, users will often be fooled by malicious redirects. Phishers often exploit redirect facilities, by providing malicious redirects, through the use of open redirects. An open redirect is a redirect parameter that will accept any URL and redirect to that URL, without first validating its value. A phisher can exploit this vulnerability in a legitimate website to redirect users to a malicious website through the open redirect. For example, as described above, a phisher can provide a link to a user, in an email, on another web page, etc., that appears to be legitimate:

http://site/redirect.php?to=http://fakesite/target.html

However, the redirect can be further obscured using encoding to replace characters in the URL. A user unfamiliar with URL encoding may not realize that the link will actually redirect them to the phisher's server. For example, the redirect URL described above could be encoded as:

http://site/
redirect.php%3Fto%3Dhttp%3A%2F%2Ffakesite%
2Ftarget.htm

URL to which the user would be redirected is obscured by the encoding, making the redirect even more difficult to detect.

Phishing vulnerability due to open redirect parameters can be detected by inspection of redirect parameters according to various techniques described herein. These techniques can be executed by the web application protection module 128 illustrated in FIG. 1. According to some embodiments, legitimate websites can be protected against outgoing traffic via outgoing redirect requests. According to other embodiments, users can be protected against being redirected to malicious web sites.

According to an embodiment, the phishing vulnerability detection techniques described herein may be implemented by in-line or out-of-line devices. Monitoring phishing vulnerability protects against attacks that exploit the HTTP and HTTPS protocols to attack Web applications.

For example, phishing vulnerability detection may be performed by identifying redirect parameters as constant parameters of type URL. In one embodiment, an ALS as may be performed in the adaptation module 350 in FIG. 3, and the ALS can be configured to learn that a redirect parameter is a constant parameter of type URL. Thereafter, whenever the ALS comes across a redirect parameter, the ALS identifies the parameter as a constant parameter of type URL.

Constant parameters are normally used by an application to maintain information across requests, and can be appended to the URL. For example, the following URL includes the parameter "sessionId" and the parameter value "1ZVVZA6772" for the parameter.

http://site.com/page.html?sessionId=1ZVVZA6772

Multiple parameters can be appended to the URL, and each parameter can be delimited by an ampersand ("&") character. In contrast, "normal" parameters are those input by a user. As used herein, a constant parameter of type URL is used by an application to maintain the target for redirect facilities. For example, a link containing a constant parameter of type URL redirecting the traffic from a legitimate site:

http://site.com/redirect.php?url=http://www.fakesite.com

As can be seen from the above example, the parameter of type "URL" has a value of "http://www.fakesite.com" which is the URL of the phisher website. In some embodiments, the URL parameters are identified by looking for parameters identified as "URL." According to other embodiments, a parameter of type URL can be identified by examining the value of the parameter. For example, the presence of "http://" or "https://" in the parameter value can indicate that the parameter is a URL.

In an exemplary embodiment, once a constant parameter of type URL is identified, adaption module 350 inspects the constant parameter of type URL to determine if the redirect parameter detected is used for a redirect function. If the redirect parameter detected is not used for a redirect function, no further action is necessary. If the redirect parameter detected is used for a redirect function, validation of the redirect parameter can be performed to determine whether action needs to be taken. According to an embodiment, the URL string from an URL parameter identified using the techniques describes above can be examined to determine whether a redirect function is being is being called. For example, returning again to the sample URL from above:

http://site.com/redirect.php?url=http://www.fakesite.com

In this example, a script called "redirect.php" is being executed by the server of the domain site.com. According to an embodiment, an administrator can define additional redirect related functions that can be identified in the URL string. Some website might use a different redirect function. For example, a website might use a redirect method call "direct-to.php" rather than "redirect.php" as in the above examples. In an embodiment, an administrator can define a list of the redirect functions strings that can be used to identify various redirect functions. As new redirect functions are identified, the list of redirect functions can be updated.

In an embodiment, policy manager display 502 can include a user interface that allows the redirect function strings entered by an administrator, and the database server 134 can store the redirect function strings in a persistent data store such as a relational database, and the redirect function strings can then be retrieved from the persistent data store via database server 134.

In one embodiment, adaption module 350 inspects the redirect parameter to determine if the redirect is to a local page, e.g., a page on the same site or server. If the redirect is to a local page, adaption module 350 further inspects the domain name to determine if the domain name is an internal domain name. If the redirect is to a local page and the domain name is an internal domain name, validation is complete.

In another embodiment, if the redirect is to a local page, the redirect function may be modified to use page references. In such cases, the domain name may be appended when sending the redirect command to web site owner. Use of page references and appending the domain name also results in complete validation.

If, however, the redirect is to an external page, e.g., a page on a different site or server, adaption module 350 will generate an event. Additionally, the URL of the redirect may be added to a list of URLs in a database on a server (e.g., application server 132 in FIG. 1). In such cases, the user may be sent the record ID of the site, but not redirected to the external page.

Additionally, in some embodiments, adaption module 350 inspects the record ID or other identifier and determines the legitimate URL from the database on the server. The user may then be directed to the legitimate URL. According to an embodiment, the user may be presented with a popup window or a webpage indicating that the user is being redirected to a new page and providing a link to the page to which the user is being directed. The popup window or webpage can include a warning that the original redirect was not directed to a legitimate site and that the user should verify that the URL to which they are being directed is correct before providing any confidential information.

Through the use of the inspecting redirect parameters, phishing vulnerability caused by open redirect parameters may be minimized. Such reduction in vulnerability may result in fewer phishing scams and associated cost benefits to legitimate web site owners.

Figure 10:
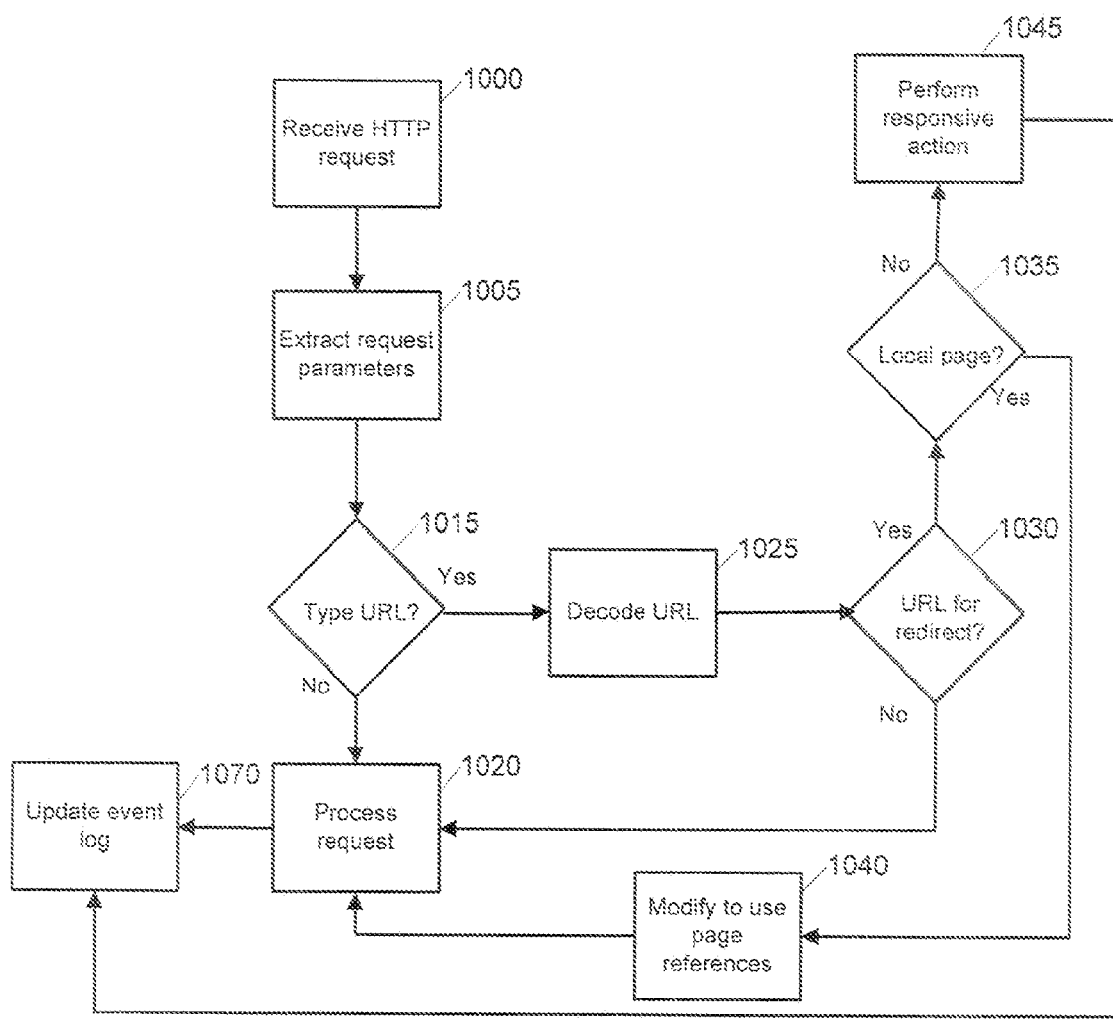
FIG. 10 is a flow chart illustrating an example technique for detecting phishing vulnerability according to an embodiment.

FIG. 10 is a flow chart illustrating an example technique for detecting phishing vulnerability according to an embodiment. In an embodiment, the technique illustrated in FIG. 10 can be implemented in application protection module 128. In another embodiment, the collaborative detection module 308 and the ACE 310 can be used to implement this technique.

An HTTP request is received (step 1000), and the request parameters are extracted (step 1005). For example, if an HTTP request is received that includes the parameter "sessionId" which has a value "1ZVVZA6772" the URL for the request would be formatted URL includes the parameter "sessionId" and the parameter value "1ZVVZA6772" for the parameter.

http://site.com/page.html?sessionId=1ZVVZA6772

According to an embodiment, the constants in the request can include URL parameters as illustrated in the following example:

http://site.com/redirect.php?url=http://www.fakesite.com

Once the parameters have been extracted from the HTTP request, a determination is made whether any of the parameters are link parameters (e.g., parameters that include URLs) (step 1015). The link parameters can be identified one or more of the techniques described above (step 1015). For example, if the parameter might be tagged as "URL" or the parameter value might include "http://" or "https://" indicating that the parameter is a URL.

If no URL parameters are identified in the request, no redirect is being performed and the HTTP request is processed (step 1020). For example, the request may be forwarded to the web server to access content referenced in the request. In an embodiment, additional threat detection techniques can be applied HTTP request before the request is processed. According to an embodiment, the receipt and/or processing of the event may be added to the event database 314 (step 1070). Events added to the event database 314 can be viewed using event viewer 318.

If URL parameters have been identified, the URLs that have been identified are decoded to remove encoded characters such as those described above (step 1025). Once the URLs have been identified and have been decoded, a determination is made whether one of the URLs is being used for redirecting (step 1030). In some embodiments, the decoding step can be skipped and the method proceeds to step (1030). In an embodiment, the determination whether a URL parameter is being used for a redirect can be made using the technique described above where the URL string is examined to determine whether it contains any of the redirect related functions from the list of redirect related functions defined in the system. The security system can include a set of predefined redirect functions that can be added to by the administrator.

If a URL parameter is being used a redirect, a determination is made whether the redirect is to a local page (step 1035). According to an embodiment, the techniques described in FIG. 11 and/or FIG. 12 can be used to determine whether a redirect is to a local page.

If the URL parameters are not being used for a redirect, then the HTTP request is can be processed (step 1020). For example, the request may be forwarded to the web server to access content referenced in the request. In an embodiment, additional threat detection techniques can be applied HTTP request before the request is processed. According to an embodiment, the receipt and/or processing of the event may be added to the event database 314 (step 1070). Events added to the event database 314 can be viewed using event viewer 318.

If the URL for the redirect is not a local page, then a responsive action is performed (step 1405). According to an embodiment, the security policy module 312 maintains a security profile that defines a set of one or more responsive actions to be taken in response to a redirect. In an embodiment, the security policy module 312 is checked to determine the appropriate responsive action to perform in the event that a redirect to an external source is identified. In an embodiment, the redirect is not performed and/or the request is blocked to prevent the request from being received at the web server. In other embodiments, the redirect can still be processed, but event information will be captured that can be used to generate phishing activity reports. For example, the event database 314 can be updated to indicate that a request that included a redirect was blocked and/or other responsive actions were performed in response to possible phishing activity. Information related to the request, such as the source of the request, the requested action or content, the date and/or time that the data was requested, and the reason that the request was deemed to be possible phishing activity may be included in the entry in the event database. Event viewer 318 can be used to view event data, and an administrator can view information about which requests were blocked or for which other responsive actions were performed using the event viewer 318.

According to an embodiment, the responsive action can include adding the URL to which the redirect was performed to a database. This information can later be used to generate reports that identify the sites for which redirects were identified, which can indicate phishing activity has been taking place. In some embodiments, the user can be provided information about a bad redirect, which can include a reference to the database record ID associated with the redirect URL in the database. If a user reports a problem and references this record ID, the administrator can look up the corresponding record in the database to determine why the redirect was prevented.

If the redirect was local, the redirect URL can be modified to use local page references (step 1040) where the domain name can be appended to the URL when sending the redirect command. Use of page references and appending the domain name can also results in complete validation of the URL. If the redirect was local (e.g., the request originated from web server 126), the HTTP request can be processed (step 1020). For example, the request may be forwarded to the web server to access content referenced in the request. In an embodiment, additional threat detection techniques can be applied HTTP request before the request is processed. According to an embodiment, the receipt and/or processing of the event may be added to the event database 314 (step 1070). Events added to the event database 314 can be viewed using event viewer 318.

Figure 11:
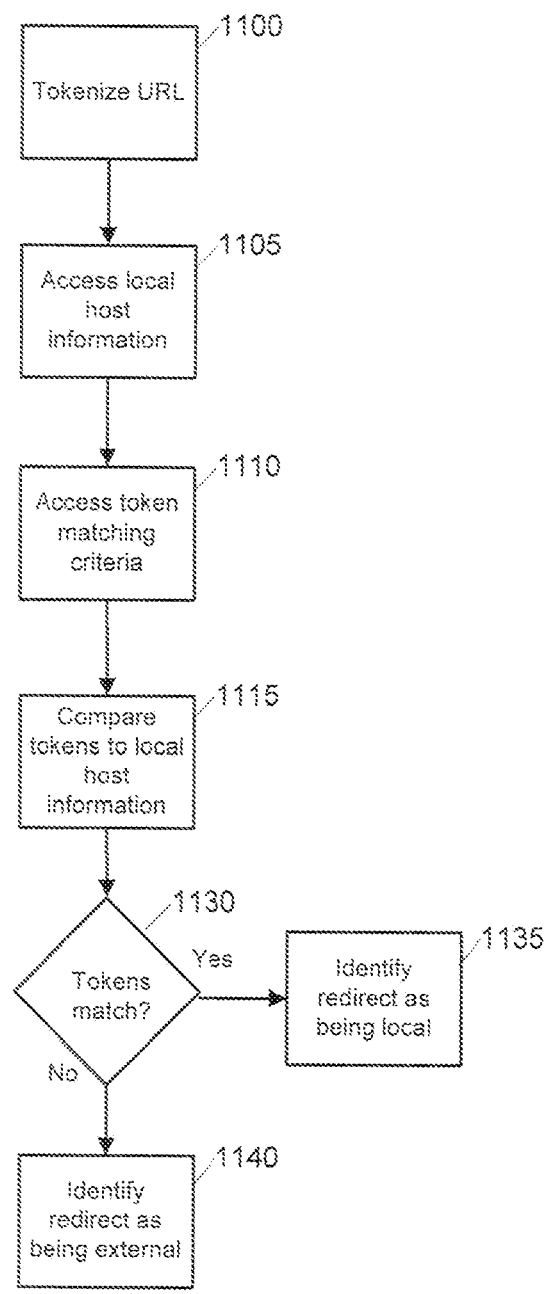
FIG. 11 is a flow chart illustrating an example technique for determining whether a redirect is to external server according to an embodiment.

FIG. 11 is a flow chart illustrating an example technique for determining whether a redirect is to external server according to an embodiment. The method of FIG. 11 can be used in conjunction with the method illustrated in FIG. 10 to make the determination of step 1035 whether the redirect is to a local page. In an embodiment, the technique illustrated in FIG. 11 can be implemented in application protection module 128. In another embodiment, the collaborative detection module 308 and the ACE 310 can be used to implement this technique.

The URL from the HTTP request is tokenized to facilitate the comparison of the referrer information to local host information that has been defined and stored in the in a persistent data store (step 1100), and the local host information is accessed from the persistent data store (step 1105). The local host information identifies which domain names are to be treated as local domain names for the purposes of determining whether a redirect is to a local host or an external host. In an embodiment, the management console illustrated in FIG. 4 can include an interface that allows an administrator to define which domain names are associated with local hosts. In an embodiment, the database server 134 can store the local host information entered by an administrator in a persistent data store, such as a relational database, and the local host information can then be retrieved from the persistent data store via database server 134 when the information is needed for determining whether a redirect is to a local host. The URL can be tokenized using the various techniques described above.

Matching criteria to be used for determining whether the referrer and the host from the HTTP request match is accessed (step 1110). In an embodiment, the database server 134 can store the matching criteria created by an administrator using the policy manager display 502 in a persistent data store such as a relational database, and the matching criteria can then be retrieved from the persistent data store via database server 134. In an embodiment, the matching criteria used to match the tokens can be the same matching criteria used in the technique described in FIG. 8.

As described with respect to FIG. 8, in an embodiment, the matching criteria used for matching tokens can be configured by an administrator. For example, a rule can be created that indicates the number of tokens be used to determine whether an external source is requesting content. According to an embodiment, an administrator can define different matching rules for different content. In another embodiment, the matching criteria can specify that tokens not related to the hostname are ignored and the remaining tokens are compared. For example, tokens such as "www," "co," and "com" tokens can be ignored for the purpose of the comparison.

A determination is made whether the tokens from the URL match any of the local host information based on the matching criteria (step 1130). If the tokens match, the URL is identified as being internal and the redirect is to a local host (step 1135). Otherwise, the URL is identified as being external and the redirect is to an external host (step 1140). The handling of the HTTP request and any responsive actions that may be taken based on whether the redirect is to a local host or an external host is described above with respect to FIG. 10.

Figure 12:
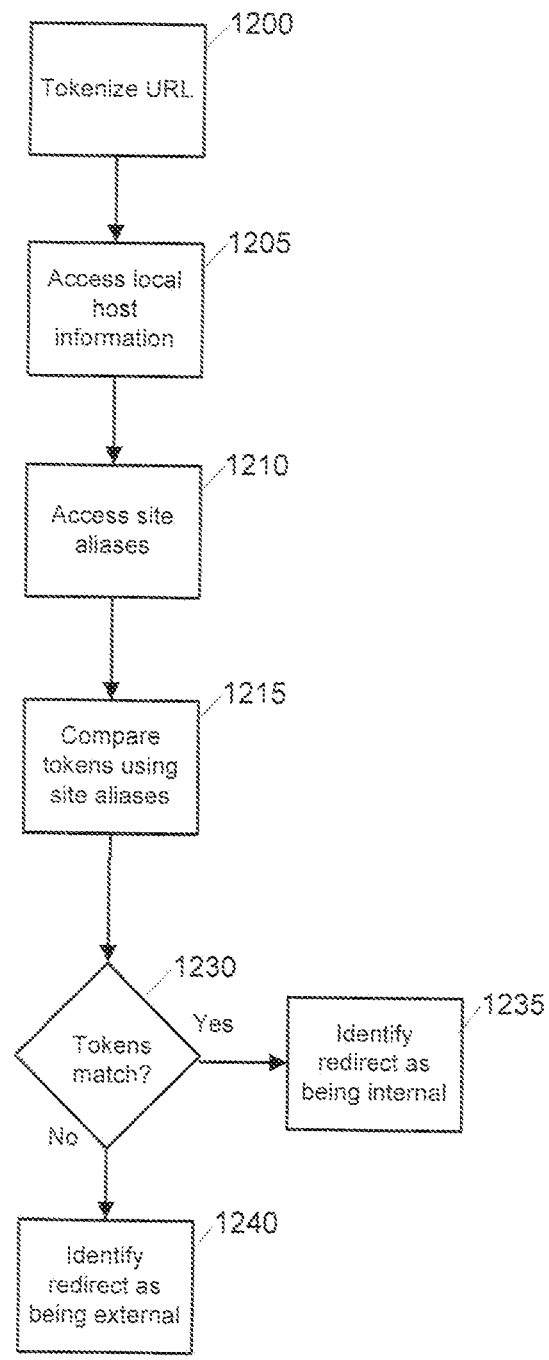
FIG. 12 is a flow chart illustrating another example technique for determining whether a redirect is to external server according to an embodiment.

FIG. 12 is a flow chart illustrating another example technique for determining whether a redirect is to external server according to an embodiment. The technique illustrated in FIG. 12 uses domain aliases when determining whether a redirect is to a local host or an external source. The method of FIG. 12 can be used in conjunction with the method illustrated in FIG. 10 to make the determination of step 1035 whether the redirect is to a local page. In an embodiment, the technique illustrated in FIG. 11 can be implemented in application protection module 128. In another embodiment, the collaborative detection module 308 and the ACE 310 can be used to implement this technique.

In an embodiment, the technique illustrated in FIG. 12 can be implemented in application protection module 128. In another embodiment, the collaborative detection module 308 and the ACE 310 can be used to implement this technique. According to some embodiments, a determination whether a redirect is to an external source can be made using both the techniques illustrated in FIGS. 11 and 12. In one embodiment, if either one of the techniques illustrated in FIGS. 11 and 12 identifies a redirect as being to a local server, the redirect is treated as being to a local server.

The URL from the HTTP request is tokenized to facilitate the comparison of the referrer information to local host information that has been defined and stored in the in a persistent data store (step 1200), and the local host information is accessed from the persistent data store (step 1205). As described above with respect to FIG. 11, the local host information identifies which domain names are to be treated as local domain names for the purposes of determining whether a redirect is to a local host or an external host. The URL can be tokenized using the various techniques described above.

Domain alias to be used for determining whether the referrer and the host from the HTTP request match is accessed (step 1210). As described above with respect to FIG. 9, in an embodiment, the site aliases can be configured by an administrator. The site aliases can be used to define a set of aliases for a domain name that can be treated as equivalent when comparing a domain name from a URL or an HTTP request header to local host information.

A determination is made whether the tokens from the referrer string and the host string based on the domain aliases (step 1230). If the tokens match, the URL is identified is internal and the redirect is identified as being a local redirect (step 1235). Otherwise, the UR is external and the redirect is identified as being an external redirect (step 1240). The handling of the HTTP request and any responsive actions that may be taken based on whether the redirect is to a local host or an external host is described above with respect to FIG. 10.

This application incorporates by reference, in their entirety, U.S. patent application Ser. No. 11/458,965, filed Jul. 20, 2006, entitled "System and Method of Securing Web Applications Against Threats"; U.S. Provisional Patent Application Ser. No. 60/807,919, filed Jul. 20, 2006, entitled "System and Method of Preventing Web Applications Threats"; U.S. patent application Ser. No. 11/532,058, filed Sep. 14, 2006, entitled "System and Method of Preventing Web Application Threats"; U.S. Provisional Patent Application Ser. No. 60/807,921, filed Jul. 20, 2006, entitled "System and Method of Securing Web Applications Across an Enterprise"; U.S. patent application Ser. No. 11/532,060, filed Sep. 14, 2006, entitled "System and Method of Securing Web Applications Across an Enterprise"; and U.S. Provisional Patent Application Ser. No. 60/988,212, filed Nov. 15, 2007, entitled "A Method and Apparatus for Detection of Information Transmission Abnormalities" In alternative embodiments the methods and systems described herein can be combined with one or more of the methods and systems described in those applications and/or can be implemented using the systems described in one or more of those applications.

While many of the examples in the present description has described preventing Web application threats, the techniques described can be used in any network, or application, to monitor and identify anomalous traffic in a network. In other words, network traffic does not have to be intended for a Web application for the techniques described to be used. In this way all network traffic, not just application traffic, can be analyzed to determine if it is acceptable traffic. For example, traffic internal to a network, such as traffic between two network users, or a network user and a network device, or any network traffic, can be monitored to determine if the conforms to acceptable user behavior.

Those of skill in the art will appreciate that the various illustrative modules, engines, and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, engines, and method steps described in connection with the embodiments disclosed herein can be implemented or performed with computer hardware including a general purpose hardware processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A method for securing a web server, the method comprising:
    tokenizing, with a processor, a referrer domain name from an HTTP header of a received HTTP request to form a set of referrer tokens, each token of the set of referrer tokens representing a portion of the referrer domain name;
    tokenizing, with the processor, a host domain name from the HTTP header to form a set of host tokens, each token of the set of host tokens representing a portion of the host domain name;
    comparing at least two referrer tokens of the set of referrer tokens to at least two host tokens of the set of host tokens, the at least two referrer tokens including a first top level domain token, the at least two host tokens including a second top level domain token;
    determining whether the received request is a result of an instruction from an external source based on whether the at least two referrer tokens match the at least two host tokens; and
    performing a responsive action if the request is the result of the instruction from the external source.

2. The method of claim 1, wherein the responsive action includes blocking the HTTP request.

3. The method of claim 1, wherein the comparison is performed using matching criteria.

4. The method of claim 3, wherein the matching criteria comprise one or more site aliases.

5. A tangible computer-readable storage disc or storage device comprising computer-readable instructions which, when executed, cause a machine to at least:
    tokenize a referrer domain name from an HTTP header of a received HTTP request to form a set of referrer tokens, each token of the set of referrer tokens representing a portion of the referrer domain name;
    tokenize a host domain name from the HTTP header to form a set of host tokens, each token of the set of host tokens representing a portion of the host domain name;
    compare at least two referrer tokens of the set of referrer tokens to at least two host tokens of the set of host tokens, the at least two referrer tokens including a first top level domain token, the at least two host tokens including a second top level domain token;
    determine whether the received request is a result of an instruction from an external source based on whether the at least two referrer tokens match the at least two host tokens; and
    perform a responsive action if the request is the result of the instruction from the external source.

6. The computer-readable storage disc or storage device of claim 5, wherein the responsive action includes blocking the HTTP request.

7. The computer-readable storage disc or storage device of claim 5, wherein the comparison is performed using matching criteria.

8. The computer-readable storage disc or storage device of claim 7, wherein the matching criteria comprise one or more site aliases.

* * * * *